United States Patent
Hasegawa et al.

(10) Patent No.: US 10,921,296 B2
(45) Date of Patent: Feb. 16, 2021

(54) SEPARATION COLUMN CONNECTION DEVICE, CONNECTION METHOD, AND ANALYSIS SYSTEM

(71) Applicant: HITACHI HIGH-TECHNOLOGIES CORPORATION, Tokyo (JP)

(72) Inventors: Hideki Hasegawa, Tokyo (JP); Masako Ishimaru, Tokyo (JP); Masuyuki Sugiyama, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 236 days.

(21) Appl. No.: 16/097,145

(22) PCT Filed: May 17, 2016

(86) PCT No.: PCT/JP2016/064606
§ 371 (c)(1),
(2) Date: Oct. 26, 2018

(87) PCT Pub. No.: WO2017/199335
PCT Pub. Date: Nov. 23, 2017

(65) Prior Publication Data
US 2020/0025727 A1    Jan. 23, 2020

(51) Int. Cl.
*G01N 30/60*    (2006.01)

(52) U.S. Cl.
CPC ................ *G01N 30/6047* (2013.01)

(58) Field of Classification Search
CPC . G01N 30/6047; G01N 30/60; G01N 30/6004
(Continued)

(56) References Cited

U.S. PATENT DOCUMENTS 8,307,541 B2    11/2012  Ford et al.
2007/0084982 A1   4/2007  Martone et al.
(Continued)

FOREIGN PATENT DOCUMENTS

JP    H07-239325 A      9/1995
JP    2007078436 A  *   3/2007
(Continued)

OTHER PUBLICATIONS

Office Action issued in Japanese Application No. 2018-517968, dated Aug. 27, 2019, 3 pages.
(Continued)

*Primary Examiner* — Tarun Sinha
(74) *Attorney, Agent, or Firm* — Procopio, Cory, Hargreaves & Savitch

(57) ABSTRACT

A separation column connecting device includes: a column holder for retaining a separation column; a first fitting holder carrying a first fitting which includes a seal portion to be connected to an upstream seal portion of the separation column and connected with an upstream pipe; a second fitting holder carrying a second fitting which includes a seal portion to be connected to a downstream seal portion of the separation column and connected with a downstream pipe; a body member to which either one of the first fitting holder and the second fitting holder is fixed; a driver for moving, relative to the body member, the first fitting holder or the second fitting holder not fixed to the body member; a guide for guiding the column holder in a direction of movement driven by the driver; and an elastic body disposed between the column holder and the second fitting holder.

15 Claims, 26 Drawing Sheets

(58) Field of Classification Search
USPC .......................................................... 73/61.53
See application file for complete search history.

(56) References Cited

U.S. PATENT DOCUMENTS

| | | |
|---|---|---|
| 2008/0038152 A1 | 2/2008 | Van Pelt |
| 2008/0283458 A1 | 11/2008 | Ishii et al. |
| 2014/0231330 A1 | 8/2014 | Baumann et al. |

FOREIGN PATENT DOCUMENTS

| | | |
|---|---|---|
| JP | 2007078436 A | 3/2007 |
| JP | 2008286783 A | 11/2008 |
| WO | 2012/058513 A1 | 5/2012 |
| WO | 2013/095964 A2 | 6/2013 |

OTHER PUBLICATIONS

Tosoh Corp., TSKgel Toriatsukai Setsumeisho Rev A., May 2012; Partial English translation provided.
International Search Report (PCT/ISA/210) issued in PCT Application No. PCT/JP2016/064606 dated Aug. 23, 2016 with English translation.
Japanese-language Written Opinion (PCT/ISA/237) issued in PCT Application No. PCT/JP2016/064606 dated Aug. 23, 2016.

* cited by examiner

SEPARATION COLUMN CONNECTION DEVICE, CONNECTION METHOD, AND ANALYSIS SYSTEM

CROSS-REFERENCE TO RELATED APPLICATIONS

This application is a U.S. National Stage entry of PCT Application No: PCT/JP2016/064606 filed May 17, 2016, the contents of which are incorporated herein by reference.

TECHNICAL FIELD

The present invention relates to a separation column connecting device which enables to downsize and provides highly reproducible connection, as well as a connection method thereof and an analysis system.

BACKGROUND ART

In liquid chromatograph (LC), solid-phase extraction (SPE) and the like, foreign substance removal and high-precision analysis at high S/N ratio can be achieved by separating a sample by means of a separation column filled with a filler. The separation column needs to be replaced depending upon a measurement object sample or replaced when the end of the useful life thereof is reached. The replacement of such a separation column is normally performed by connecting a fitting to the separation column or disconnecting the fitting from the separation column using a tool such as a spanner. Depending upon the proficiency of a worker, a seal portion may suffer leakage due to fastening failure. The leakage leads to the deterioration of reproducibility of retention time as an index of analytical performance in sample separation. Particularly in the case of a high-performance LC requiring high pressure resistance, a highly reproducible sealing performance is crucial.

In an actual analysis process, the following continuous analysis may sometimes be performed for throughput enhancement purpose. That is, a plurality of separation columns are mounted in a system where a separation column to be used is selected by switching a valve so that while one separation column is washed and equilibrated, the other separation column is used for analysis. With the increase in the number of separation columns, the operation of connecting and disconnecting the separation column becomes more cumbersome and besides, a larger space is required. It is therefore important to establish a compact and simple replacement mechanism and replacement method.

Patent Literatures 1and 2 are examples of publicly known art related to the replacement of separation column. These examples are adapted for automatic replacement of the separation column and for connection of the separation column with the fittings without using the tool.

CITATION LIST

Patent Literatures

Patent Literature 1: U.S. Pat. No. 8,307,541 B2
Patent Literature 2: US 2008/0038152 A1

SUMMARY OF INVENTION

Technical Problem

To prevent the invasion of air into the separation column, the replacement of the separation column must be performed as follows. When the separation column is disconnected, a secondary side (downstream) pipe is first disconnected from the separation column. When the separation column is connected, a primary side (upstream) pipe is first connected to the separation column. The air invasion constitutes a factor lowering LC analysis performance. Since the filler in the separation column has a high flow path resistance, it is extremely difficult to remove air once intruded into the separation column. Furthermore, the removal of air takes much time and besides, lowers the throughput of analysis.

Since the methods of the patent literatures land 2 do not contemplate the operations where the downstream pipe is first disconnected but the upstream pipe is first connected, the air invasion into the separation column is unavoidable. If a mechanism for drivingly moving the fitting is provided on both an upstream side and a downstream side of the separation column, as set forth in Patent Literature 2, connecting/disconnecting timing on the upstream side can be shifted from that on the downstream side. However, this configuration requires two drivers, which leads to an increased size of the device. Particularly, a configuration requiring a plurality of separation columns results in a large scaled system.

Solution to Problem

According to an aspect of the invention, a separation column connecting device includes: a column holder for retaining a separation column; a first fitting holder carrying a first fitting which includes a seal portion to be connected to an upstream seal portion of the separation column and is connected with an upstream pipe; a second fitting holder carrying a second fitting which includes a seal portion to be connected to a downstream seal portion of the separation column and is connected with a downstream pipe; a body member to which either one of the first fitting holder and the second fitting holder is fixed; a driver for moving, relative to the body member, the first fitting holder or the second fitting holder that is not fixed to the body member; a guide for guiding the column holder in a direction of movement driven by the driver; and an elastic body disposed between the column holder and the second fitting holder.

According to another aspect of the invention, an analysis system includes: the separation column connecting device according to the invention; a pump for feeding a sample to the separation column via the upstream pipe; a sample injection part for injecting the sample into the upstream pipe; a detector for detecting an elution component from the separation column; and a data processor for analysis of detection result obtained by the detector.

According to another aspect of the invention, a separation column connection method includes: placing a separation column between a first fitting and a second fitting, the first fitting including a seal portion to be connected to an upstream seal portion of the separation column and is connected with an upstream pipe, and the second fitting including a seal portion to be connected to a downstream seal portion of the separation column and is connected with a downstream pipe; first connecting the first fitting to the separation column by bringing the first fitting and the second fitting close to each other by applying a repulsive force or resistive force between the separation column and the second fitting; and connecting the second fitting to the separation column by further bringing the first fitting and the second fitting closer to each other.

It is noted here that a member to which either one of the first fitting holder and the second fitting holder is fixed is referred to as a body member of the separation column connecting device. The other unfixed fitting holder and the column holder are not fixed to the body member and are movable relative to the body member. According to the embodiment, a member or mechanism for generating a repulsive force or resistive force between the column holder and the second fitting holder being moved close to each other such as to interrupt the movement closing the distance therebetween is referred to as an elastic body. The elastic body includes: compression spring; tension spring; a mechanism consisting of a cylinder filled with gas or liquid and a piston; rubber; a combination of magnets applying an attractive force or repulsive force; and the like. A member for guiding the column holder in a direction of movement driven by the driver is referred to as guide.

Advantageous Effects of Invention

The invention provides a connecting/disconnecting operation for separation column where a fitting driver on only one side operates to disconnect the downstream pipe first from the separation column and to connect the upstream pipe first to the separation column. Hence, the device configured to enable cost reduction and downsizing can prevent the air invasion and provide highly reproducible analysis.

These and other objects, features and advantages of the invention will become apparent from the following description of the embodiments thereof.

DESCRIPTION OF EMBODIMENTS

Figure 1A:
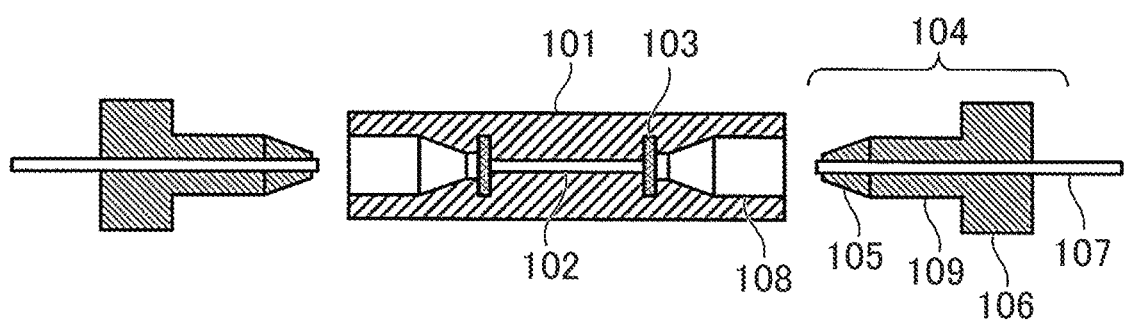
FIG. 1A is a schematic sectional view showing a conventional separation column in an open state.
Figure 1B:
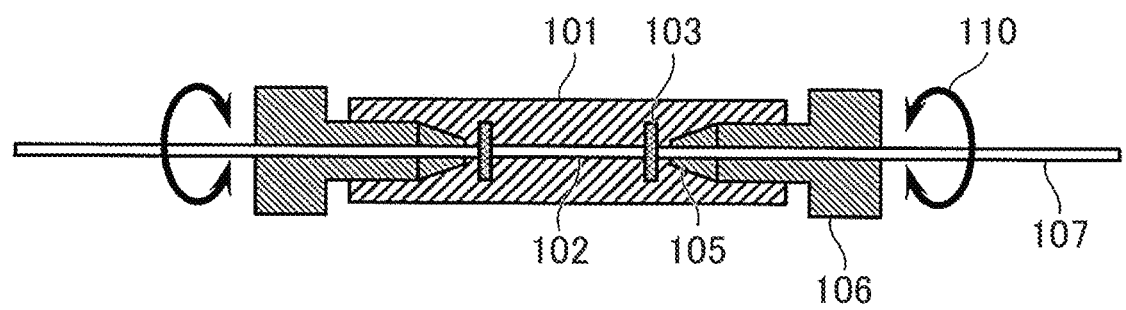
FIG. 1B is a schematic sectional view showing the conventional separation column in a connected state.

FIG. 1A is a schematic sectional view showing a conventional separation column in an open state. FIG. 1B is a schematic sectional view showing the conventional separation column in a connection state. As shown in FIG. 1A, a separation column 101 is a cylindrical body filled with a filler 102, including a frit 103 serving as a filter on either side of the filler, an internal thread portion 108 for connection with a pipe 107, and the like. The pipe 107 is connected by means of a fitting 104 (ferrule 105 and a set screw 106). When the ferrule 105 is threaded in by turning an external thread portion 109 of the set screw 106 relative to the internal thread portion 108 of the separation column 101 in a direction indicated by an arrow 110 shown in FIG. 1B, sealing is accomplished by the ferrule 105 and a tapered portion of the separation column 101. At this time, an inside diameter portion of a distal end of the ferrule 105 comes into close contact with an outside diameter portion of the pipe 107 (in some cases, the outside diameter portion of the pipe digs into the inside diameter portion of the ferrule) so that the separation column is sealed. Thus, pressure tightness on the order of 100 MPa can be obtained in some condition, enabling high-performance LC separation based on high-flow liquid feeding.

Unfortunately, the conventional connection method involves a skilled job to fasten the components with screw and hence, the working efficiency is low. In the case of an apparatus equipped with a plurality of separation columns, the replacement work involves an immense amount of time and labor. Although an apparatus adapted for automatic replacement of separation columns has been proposed, the apparatus does not go so far as to contemplate avoiding the air invasion into the separation column.

Embodiments of the invention will be described as below.

Embodiment 1

FIGS. 2A to 2D are schematic fragmentary sectional views showing a separation column connecting device according to a first embodiment of the invention.

The separation column connecting device according to the embodiment includes: a first fitting holder 12 fixed to a rail 16 as a body member; a column holder 11 carried on a guide 14 moved along the rail 16; and a second fitting holder 13 driven along the rail 16 by a driver 15. A compression spring 17 as an elastic body is interposed between the second fitting holder 13 and the column holder 11. A separation column 2 is set on the column holder 11. A first fitting 3 previously connected with an upstream pipe 5 is mounted on the first fitting holder 12. A second fitting 4 previously connected with a downstream pipe 6 is mounted on the second fitting holder 13.

The column holder 11 includes a locking portion 18, while the guide 14 includes a locking portion 19. The second fitting holder 13 is provided with a first stopper 20 which includes a projection 22 to contact with the locking portion 18 of the column holder 11. The first fitting holder 12 is provided with a second stopper 21 which includes a projection 23 to contact with the locking portion 19 of the guide 14.

As described above, the column holder 11 and the first stopper 20 have contact structures which contact with each other to inhibit each other from moving freely in a driving direction of the driver 15. The contact structures are herein referred to as the locking portion 18 and the projection 22. Similarly, the guide 14 and the second stopper 21 have contact structures which contact with each other to inhibit each other from moving freely in the driving direction of the driver 15. The contact structures are herein referred to as the locking portion 19 and the projection 23.

Figure 2A:
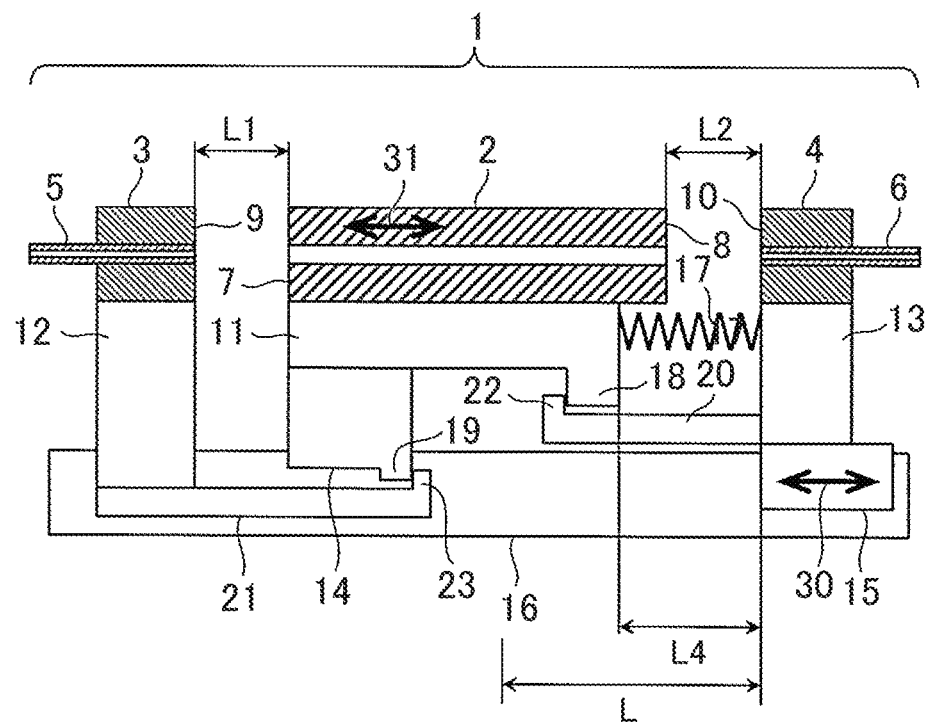
FIG. 2A is a schematic fragmentary sectional view showing an example of a separation column connecting device in an open position.
Figure 2B:
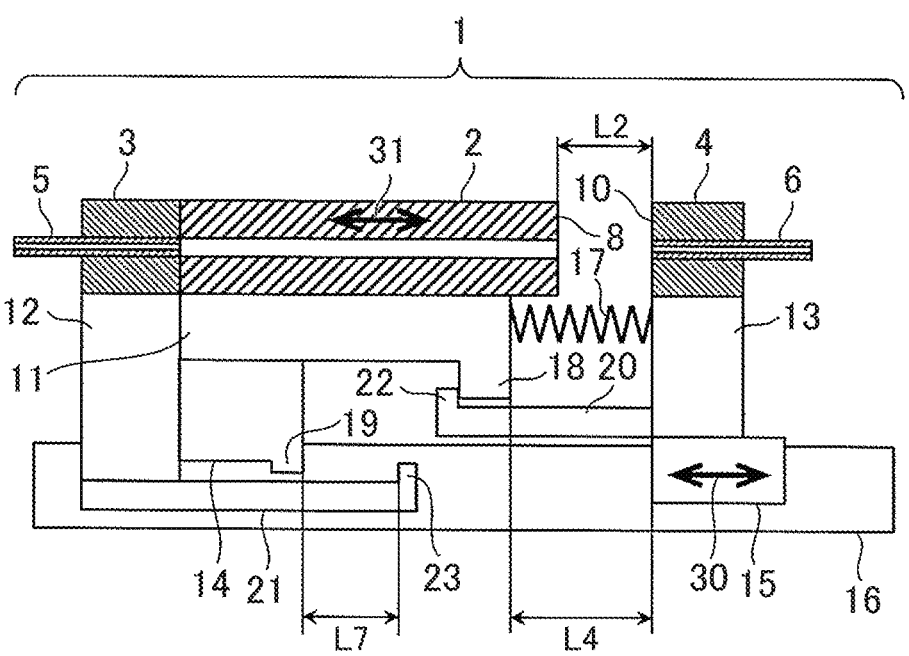
FIG. 2B is a schematic fragmentary sectional view showing the example of the separation column connecting device in a first fitting connection position.
Figure 2C:
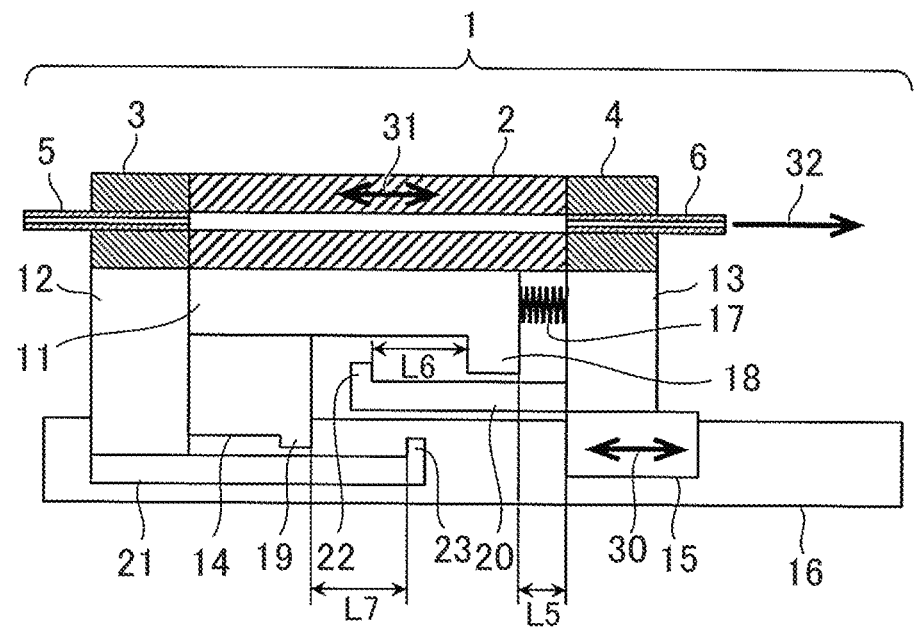
FIG. 2C is a schematic fragmentary sectional view showing the example of the separation column connecting device in a connection position.
Figure 2D:
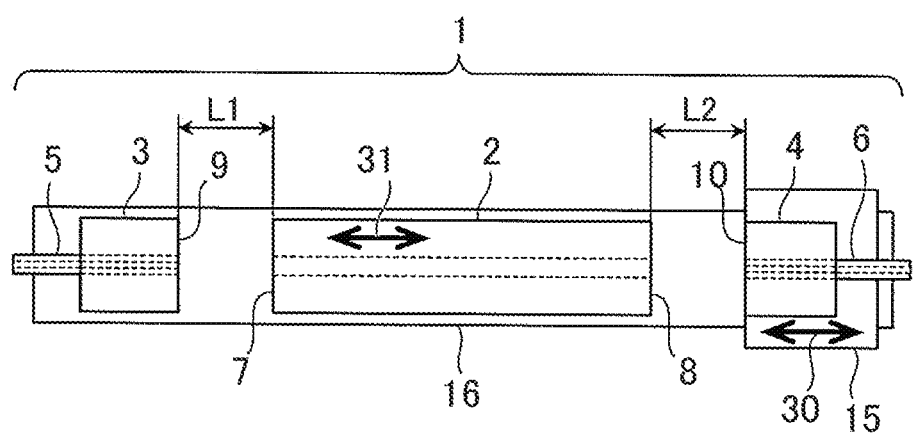
FIG. 2D is a schematic plan view showing the example of the separation column connecting device in the open position.

This embodiment is an example of a separation column connecting device which drives the second fitting holder. FIG. 2A is a schematic fragmentary sectional view showing an "open position" where the first fitting 3 and the second fitting 4 are separate from the separation column 2. FIG. 2B is a schematic fragmentary sectional view showing a "first fitting connection position" where the first fitting 3 is connected to the separation column 2. FIG. 2C is a schematic fragmentary sectional view showing a "connection position" where the first fitting 3 and the second fitting 4 are connected to the separation column 2. FIG. 2D is a schematic plan view of the separation column connecting device in the "open position" as seen from above.

The separation column 2 set on the column holder 11 in the state shown in FIG. 2A is first connected with the first fitting 3 and then is connected with the second fitting 4 according to the order of the citation FIG. 2A→FIG. 2B→FIG. 2C (connecting process). In a case where the replacement of the separation column 2 or the like is necessary, the separation column 2 is released according to the order of the citation FIG. 2C→FIG. 2B FIG. 2A (releasing process).

In the connecting process, the second fitting holder 13 carrying the second fitting 4 is moved by the driver 15 along the rail 16 in a direction of an arrow 30. Namely, the second fitting 4 is moved toward the first fitting 3. In conjunction with the movement of the second fitting holder 13, the compression spring 17 forces the column holder 11 and the separation column 2 to move in a direction of an arrow 31. The column holder 11 and the separation column 2 are carried on the guide 14 and hence, are moved along with the guide 14 on the rail 16. The movement of the separation column 2 brings an upstream seal portion 7 of the separation column 2 into connection with a seal portion 9 of the first fitting 3, thus establishing the state shown in FIG. 2B (first fitting connection position). Subsequently, the driver 15 continues to move the second fitting holder 13, further compressing the compression spring 17. Finally, the driver brings a seal portion 10 of the second fitting 4 into connection with a downstream seal portion 8 of the separation column 2, thus establishing the state shown in FIG. 2C (connection position). After establishment of the state of FIG. 2C, sample analysis is performed by passing a solution from the upstream pipe 5 through the separation column 2 in a direction of an arrow 32. If the driver 15 can apply a force substantially equal to an axial force given by a normal tightening torque on the set screw 106 shown in FIG. 1, even the structure simply configured to press one component against the other as shown in FIG. 2C can achieve a sufficient pressure tightness at each connection portion.

Figure 3:
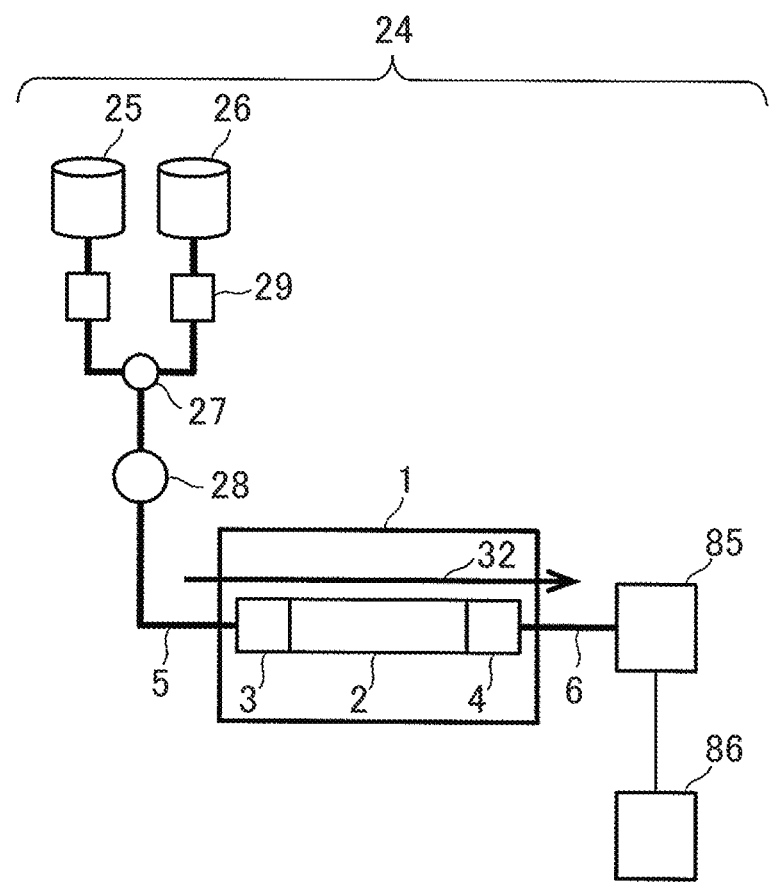
FIG. 3 is a schematic diagram showing an exemplary configuration of an analysis system.

FIG. 3 is a schematic diagram showing an exemplary configuration of an analysis system 24 performing sample analysis. A sample fed into an automated sampler 28 as a sample injection part is fed into a pipe 5 by means of a pump 29 as carried by a mobile phase 25 or a mobile phase 26 or a mixture thereof as mixed by a mixer 27. An organic solvent, water and the like are normally used as the mobile phase 25 and 26. A sample solution flows through the upstream pipe 5, the first fitting 3, the separation column 2, the second fitting 4, and the downstream pipe 6 in this order and in the direction of the arrow 32. The sample solution reaches a detector 85 for detection of an elution component, while a data processor 86 performs analysis. A variety of detection methods such as mass spectrometer, ultraviolet and visible ray detecting device, photodiode array detector, and fluorescent detector can be used for the detector 85.

While the connecting process is performed in the order of FIG. 2A→FIG. 2B→FIG. 2C as described above, the releasing process performed in the order of FIG. 2C→FIG. 2B→FIG. 2A is basically the inverse operation of the connecting process. When the driver 15 returns the second fitting 4 to place, the second fitting 4 is first separated from the separation column 2 in a state where the compression spring 17 forces the first fitting 3 to stay in connection with the separation column 2. Subsequently, the first fitting 3 is separated from the separation column 2.

The first stopper 20 and the second stopper 21 are disposed for the purpose of reproducibly returning the individual components to the open positions shown in FIG. 2A in the releasing process. The first stopper 20 includes the projection 22 for limiting the movement of the column holder 11. The second stopper 21 includes the projection 23 for limiting the movement of the guide 14. The column holder 11 includes the locking portion 18 to contact with the projection 22. The guide 14 includes the locking portion 19 to contact with the projection 23. If the seal portion 7 of the separation column 2 and the seal portion 9 of the first fitting 3 adhere to each other and become inseparable in the step of FIG. 2B→FIG. 2A of the releasing process, these seal portions can be forcibly separated from each other by pulling the column holder 11 by way of the first stopper 20. In the step of FIG. 2A→FIG. 2B of the connecting process or in the step of FIG. 2B→FIG. 2A of the releasing process, an unwanted movement of the column holder 11 due to the extension and retraction of the compression spring 17 can be obviated by means of the compression spring 17 pressing the locking portion 18 of the column holder 11 against the projection 22 of the first stopper 20. When the connecting device is returned to the state of FIG. 2A in the releasing process, the column holder 11 may be excessively shifted toward the right as seen in FIG. 2A due to an insufficient strength of the compression spring 17. This problem can be obviated by the projection 23 of the second stopper 21 which abuts against the locking portion 19 so as to stop the guide 14 moving too far.

Provided that at the open positions shown in FIG. 2A, L1 denotes a distance between the seal portion 9 and the seal portion 7, L2 denotes a distance between the seal portion 10 and the seal portion 8, and L4 denotes a length of the compression spring 17. Further, provided that at the connection positions shown in FIG. 2C, L5 denotes a length of the compression spring 17, L6 denotes a distance between the locking portion 18 and the projection 22, and L7 denotes a distance between the locking portion 19 and the projection 23. The first stopper 20 limits the movement of the column holder 11 so that a distance between the separation column 2 and the second fitting 4 does not exceed L2. The second stopper 21 limits the movement of the column holder so that a distance between the first fitting 3 and the separation column 2 does not exceed L1.

A feature of the configuration is in that in the step of FIG. 2A FIG. 2B of the connecting process or in the step of FIG. 2B→FIG. 2A of the releasing process, the device provides L1=L7, L2=L6 by operating with the compression spring 17 maintaining the distance L2. Provided that L3 (=|L4−L5|) denotes a displacement of the compression spring 17 between the open position and the connection position, the seal portion 10 comes into contact with the seal portion 8 when L2=L3. By defining the range of movement (stroke) L of the driver 15 as L≤L1+L2, the driver can further apply a force to the components in contact state so as to obtain the pressure tightness at the contact portion.

In the separation column connecting device 1 of the embodiment, the first fitting 3 and the first fitting holder 12 do not move and hence, may be in a stationary state. Therefore, the action of the compression spring 17 permits the driver 15 on only one side to first connect the upstream first fitting 3 and the separation column 2. Further, the stoppers 20 and 21 enable a highly reproducible operation. While FIG. 2A shows the example where the second fitting holder 13 and the first stopper 20 are separate components and the first fitting holder 12 and the second stopper 21 are separate components, these pairs may be formed in one piece, respectively. The second fitting holder 13 may also double as the first stopper 20. The first fitting holder 12 may also double as the second stopper 21. Further, the driver 15 and the second fitting holder 13 may also be formed in one piece. Furthermore, both pairs of the first fitting 3 and the first fitting holder 12, and the second fitting 4 and the second fitting holder 13 may also be formed in one piece. The column holder 11 may be integrally formed with the guide 14 or may double as the guide 14. The column holder 11 and the separation column 2 may also be formed in one piece. The driver 15 may be manually operated or automated. For the purpose of reference, FIG. 2D schematically shows the releasing process of FIG. 2A in plan view as seen from above. The figure omits the holders, stoppers and spring for simplicity's sake.

The configuration of the first embodiment permits the driver on only one side to accomplish the operation of connecting and disconnecting the separation column where the separation column is first connected to the upstream pipe and where the separation column is first disconnected from the downstream pipe. According to the configuration of the embodiment, the first fitting is not movable and hence, the upstream pipe can be shortened and a dead volume on the upstream side can be reduced.

Embodiment 2

This embodiment illustrates an example of a separation column connecting device where a ferrule and a set screw constitute the fitting.

Figure 4:
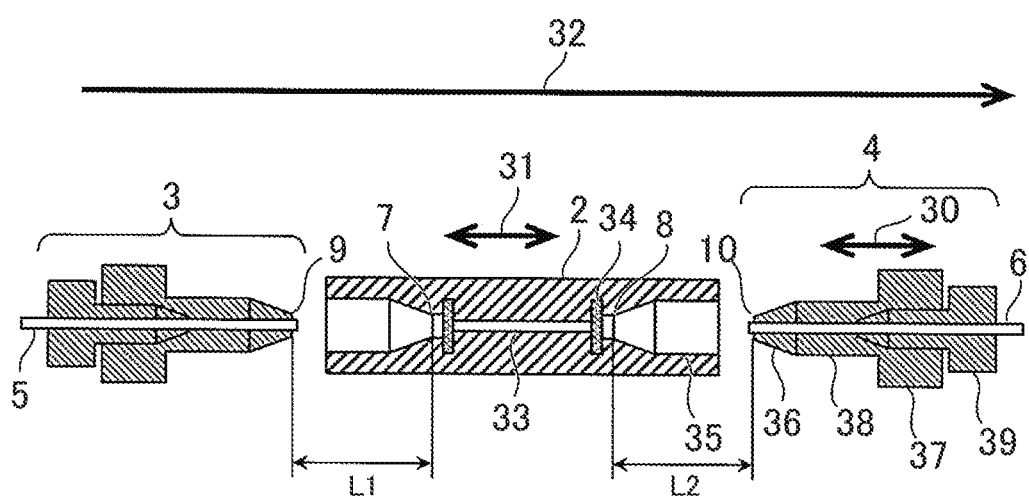
FIG. 4 is a schematic sectional view showing an exemplary configuration of a separation column connecting device.

FIG. 4 is a schematic sectional view showing an exemplary configuration of a separation column connecting device according to a second embodiment. The figure illustrates examples of the separation column 2, the first fitting 3 and the second fitting 4. Since the separation column connecting device is basically configured almost the same way as that shown in FIGS. 2A to 2D, the description is made on differences. The separation column 2 is filled with a filler 33 for separating the sample and includes a frit 34 serving as a filter. The first fitting 3 and the second fitting 4 each consist of a ferrule 36 and an adapter 37.

If the driver 15 is operated by the separation column connecting device 1 equipped with the compression spring 17 as illustrated by the first embodiment, the second fitting 4 makes a linear movement as indicated by the arrow 30. Since the separation column is connected or disconnected by the linear movement of the fitting, the internal thread portion 108 of the commonly used separation column 101 and the external thread portion 109 of the set screw 106 are not necessary. Therefore, the separation column 2 includes a threadless inside diameter portion 35 while the adapter 37 corresponding to the commonly used set screw 106 includes a threadless outside diameter portion 38. If the inside diameter portion 35 is formed with threads, it does not matter if an inside diameter of the threads is larger than the diameter of the outside diameter portion 38. Conversely if the outside diameter portion 38 is formed with threads, it does not matter if an outside diameter of the threads is smaller than the diameter of the inside diameter portion 35. Further, if both the inside diameter portion 35 and the outside diameter portion 38 are formed with threads, it does not matter if a thread inside diameter of the inside diameter portion 35 is larger than a thread outside diameter of the outside diameter portion 38.

According to a configuration where the ferrule 36 is separate from the adapter 37, there is a possibility that the ferrule 36 and the pipes 5 and 6 may suffer adhesion between the contact portions thereof, which causes the releasing process to fail to return the ferrule and the pipes to the open position. It is therefore preferred that the ferrule 36 is previously squeezed and fixed on the pipes 5 and 6 while the fitting further includes a connector 39 or the like for fixing the adapter 37 and the pipes 5 and 6.

The fitting configuration of the second embodiment has a merit of being more versatile because the fitting is also adaptable to a connector of the commonly used separation column.

Embodiment 3

This embodiment illustrates an example of a separation column connecting device where the fitting is formed with a male taper portion at a distal end thereof.

Figure 5:
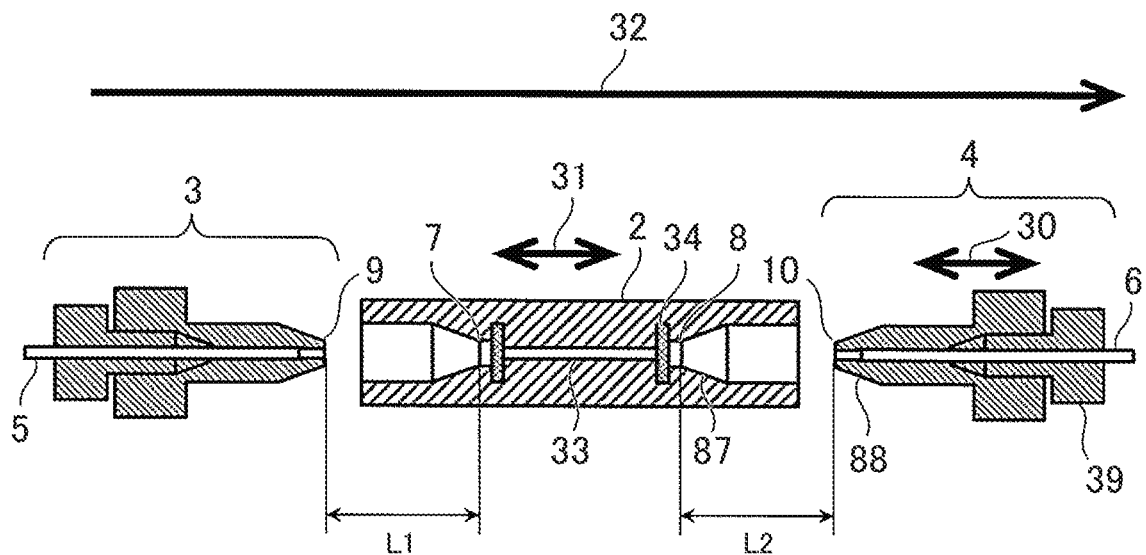
FIG. 5 is a schematic sectional view showing an exemplary configuration of a separation column connecting device.

FIG. 5 is a schematic sectional view showing an exemplary configuration of a separation column connecting device according to a third embodiment. The figure illustrates examples of the separation column 2, the first fitting 3 and the second fitting 4. Since the separation column connecting device is basically configured almost the same way as that shown in FIG. 2, the description is made on differences. The separation column 2 includes a female taper portion 87, while the first fitting 3 and the second fitting 4 include a male taper portion 88, respectively.

The fitting of the third embodiment is configured to unify the ferrule and the adapter of the second embodiment, negating the need for previously squeezing and fixing the ferrule on the pipe. Thus, the embodiment can achieve cost reduction and structure simplification.

Embodiment 4

This embodiment illustrates an example of a separation column connecting device where the fitting is formed with a female taper portion at a distal end thereof.

Figure 6:
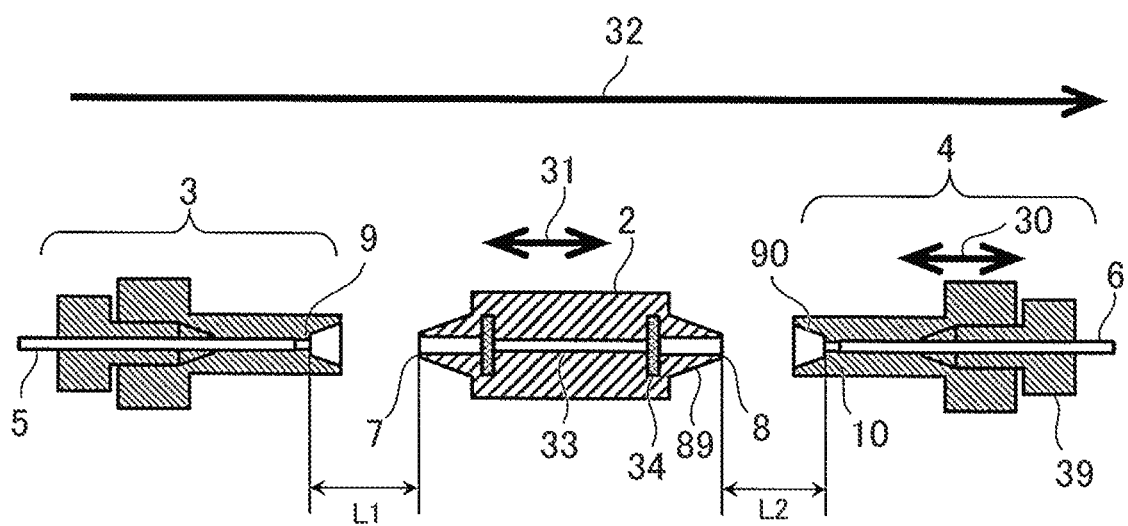
FIG. 6 is a schematic sectional view showing an exemplary configuration of a separation column connecting device.

FIG. 6 is a schematic sectional view showing an exemplary configuration of a separation column connecting device according to a fourth embodiment. The figure illustrates examples of the separation column 2, the first fitting 3 and the second fitting 4. Since the separation column connecting device is basically configured almost the same way as that shown in FIGS. 2A to 2D, the description is made on differences. The separation column 2 includes a male taper portion 89, while the first fitting 3 and the second fitting 4 include a female taper portion 90, respectively.

The fitting configuration of the fourth embodiment can reduce the number of replacements of the fitting side by forming the male taper portion at the separation column side, the separation column normally having a shorter service life than the fitting. The male portion is prone to be deformed by repeated connections and disconnections.

Embodiment 5

This embodiment illustrates an example of a separation column connecting device where the fitting has a flat-shaped distal end.

Figure 7:
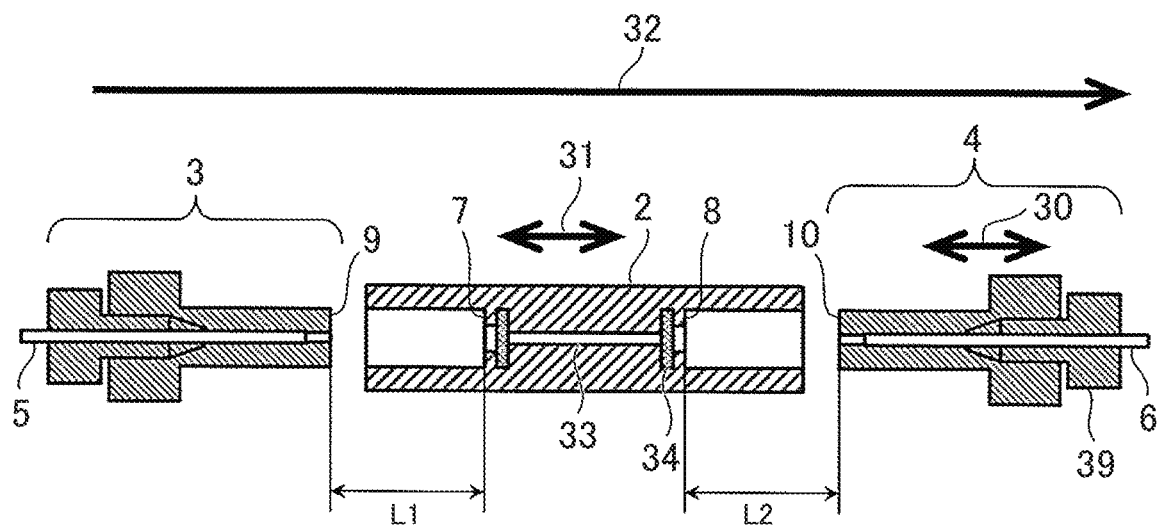
FIG. 7 is a schematic sectional view showing an exemplary configuration of a separation column connecting device.

FIG. 7 is a schematic sectional view showing an exemplary configuration of a separation column connecting device according to a fifth embodiment. The figure illustrates examples of the separation column 2, the first fitting 3 and the second fitting 4. Since the separation column connecting device is basically configured almost the same way as that shown in FIGS. 2A to 2D, the description is made on differences. The separation column 2 includes flat seal portions 7 and 8, while the first fitting 3 and the second fitting 4 have flat seal portions 9 and 10, respectively.

The fitting configuration of the fifth embodiment is adapted to reduce a dead volume of the connection portion and to simplify a part structure in comparison with the tapered shape.

Embodiment 6

This embodiment illustrates an example of a separation column connecting device where the fitting is formed with a doughnut shaped protrusion at a distal end thereof.

Figure 8:
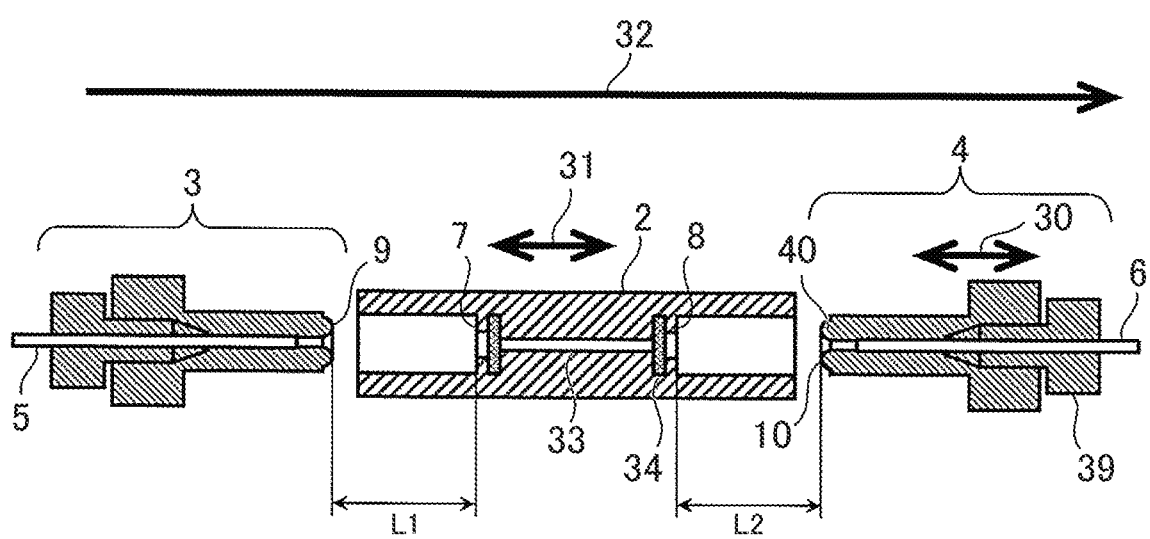
FIG. 8 is a schematic sectional view showing an exemplary configuration of a separation column connecting device.

FIG. 8 is a schematic sectional view showing an exemplary configuration of a separation column connecting device according to a sixth embodiment. The figure illustrates examples of the separation column 2, the first fitting 3 and the second fitting 4. Since the separation column connecting device is basically configured almost the same way as that shown in FIGS. 2A to 2D, the description is made on differences. The separation column 2 includes the flat seal portions 7 and 8. The first fitting 3 and the second fitting 4 have the seal portions 9 and 10 shaped like a doughnut-shaped protrusion 40 at the distal ends thereof, respectively. The doughnut-shaped protrusion 40 protrudes like an arc and hence, makes a linear contact with the seal portions 7 and 8. With the same pressing force, this configuration can obtain a larger surface pressure (=pressing force/contact area) than the configuration of FIG. 7 which makes a planar contact. An internal pressure exceeding a surface pressure induces leakage. This configuration can achieve higher pressure tightness.

The fitting configuration of the sixth embodiment is a simple structure that can achieve high pressure tightness.

Embodiment 7

This embodiment illustrates an example of a separation column connecting device which is configured to drive the first fitting holder. In this embodiment, the second fitting holder 13 is fixed to the body member, namely the rail 16. The separation column 2 and the first fitting holder 12 are movable relative to the body member.

Figure 9A:
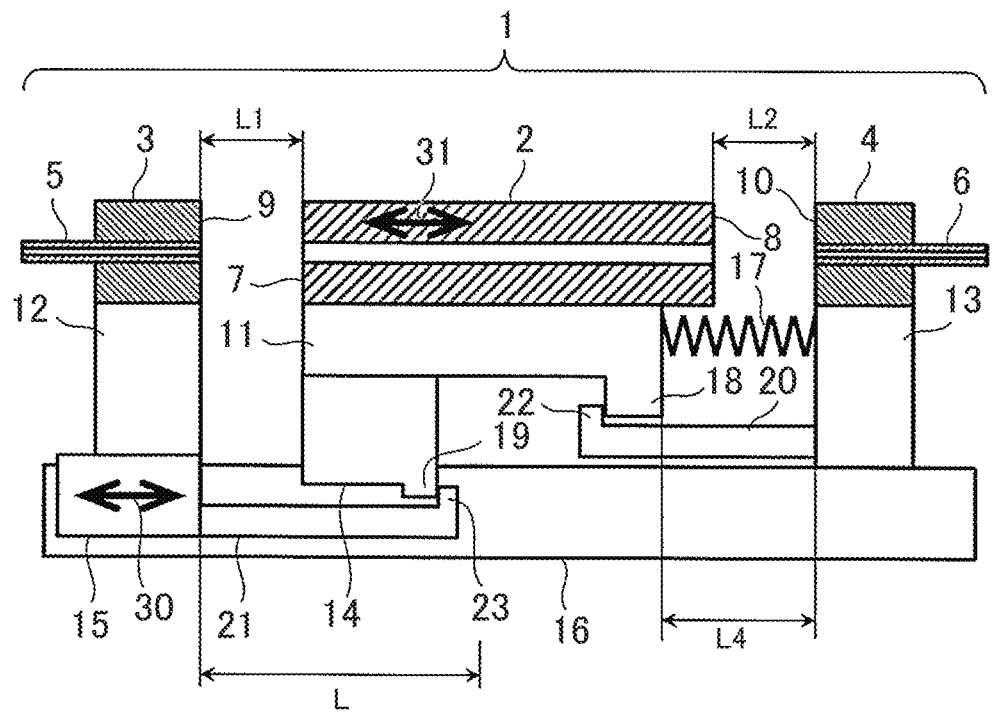
FIG. 9A is a schematic fragmentary sectional view showing an example of a separation column connecting device in the open position.
Figure 9B:
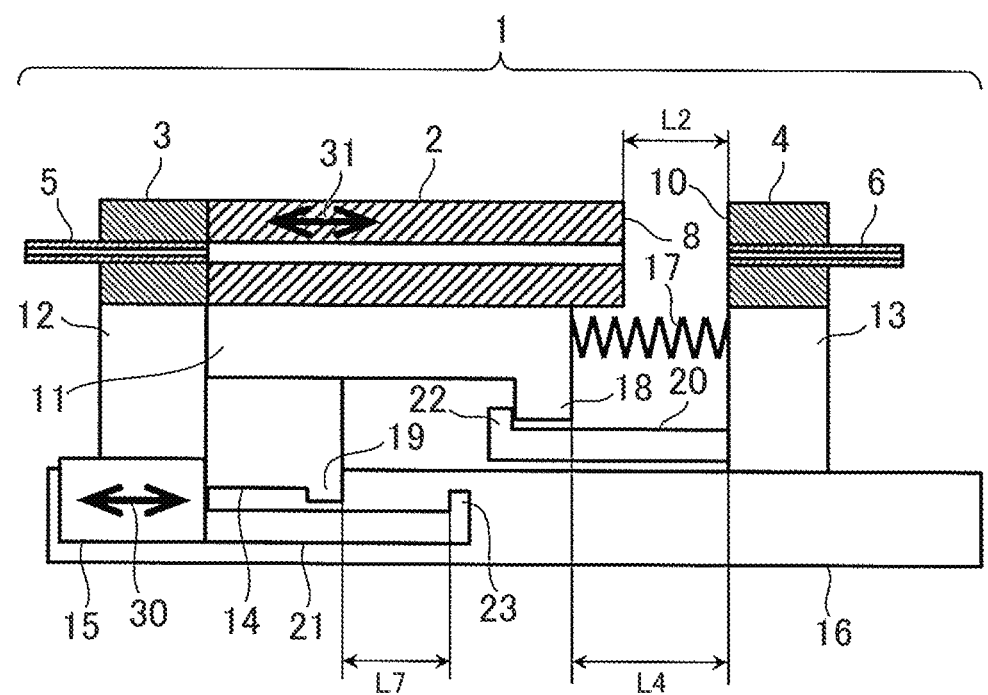
FIG. 9B is a schematic fragmentary sectional view showing the example of the separation column connecting device in the first fitting connection position.
Figure 9C:
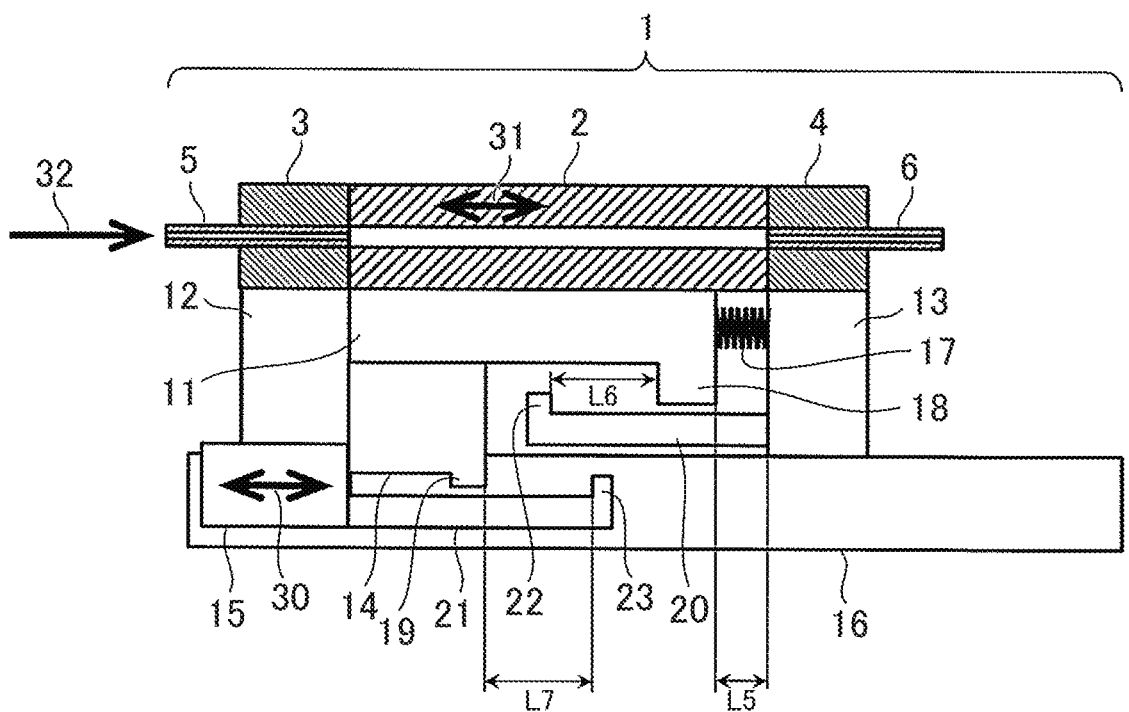
FIG. 9C is a schematic fragmentary sectional view showing the example of the separation column connecting device in the connection position.

FIGS. 9A to 9C are schematic fragmentary sectional views showing an exemplary configuration of a separation column connecting device 1 according to a seventh embodiment. FIG. 9A is a schematic fragmentary sectional view showing the "open position" where the first fitting 3 and the second fitting 4 are separate from the separation column 2. FIG. 9B is a schematic fragmentary sectional view showing the "first fitting connection position" where the first fitting 3 is connected to the separation column 2. FIG. 9C is a schematic fragmentary sectional view showing the "connection position" where the first fitting 3 and the second fitting 4 are connected to the separation column 2.

Since the separation column connecting device is basically configured almost the same way as that shown in FIGS. 2A to 2D, the description is made on differences. In this embodiment, the driver 15 drives the first fitting holder 12 carrying the first fitting 3. The second fitting 4 and the second fitting holder 13 are immovable as fixed to the rail 16. Just as in the first embodiment, the compression spring 17 as the elastic body is interposed between the second fitting holder 13 and the column holder 11.

From the "open position" shown in FIG. 9A, the first fitting holder 12 carrying the first fitting 3 is moved by the driver 15 along the rail 16 to the separation column 2 in the direction of the arrow 30. Then, the seal portion 9 of the first fitting 3 is first connected to the upstream seal portion 7 of the separation column 2. Thus, the state shown in FIG. 9B (first fitting connection position) is established. At this time, the compression spring 17 acts to keep the separation column 2 unconnected with the second fitting 4. Subsequently, the driver 15 further moves the first fitting holder 12 toward the separation column 2. Then, the column holder 11 pushed by the first fitting holder 12 is moved to compress the compression spring 17, finally bringing the downstream seal portion 8 of the separation column 2 into connection with the seal portion 10 of the second fitting 4. Thus, the state shown in FIG. 9C (connection position) is established.

That is, the separation column 2 set on the column holder 11 in the state of FIG. 9A is first connected with the first fitting 3 and then is connected with the second fitting 4 as indicated by FIG. 9A→FIG. 9B→FIG. 9C (connecting process). In a case where the separation column 2 or the like need to be replaced, the separation column 2 is released by the process indicated by FIG. 9C→FIG. 9B→FIG. 9A (releasing process). The releasing process is basically the inverse operation of the connecting process. When the driver 15 moves the first fitting holder 12 away from the second fitting holder 13, the compression spring 17 first forcibly separates the second fitting 4 from the separation column 2. Thereafter, the first fitting 3 is separated from the separation column 2.

Just as in the first embodiment, the first stopper 20 and the second stopper 21 function to reproducibly return the individual members to the positions shown in FIG. 9A in the releasing process. If the seal portion 7 of the separation column 2 and the seal portion 9 of the first fitting 3 adhere to each other and become inseparable during the step of FIG. 9B→FIG. 9A of the releasing process, these seal portions can be forcibly separated by the driver 15 pulling the first fitting 3 away from the separation column 2 with the column holder 11 fixed at position by the first stopper 20. In the step of FIG. 9A→→FIG. 9B of the connecting process or in the step of FIG. 9B→FIG. 9A of the releasing process, the unwanted movement of the column holder 11 due to the extension and retraction of the compression spring 17 can be obviated by means of the compression spring 17 pressing the locking portion 18 of the column holder 11 against the projection 22 of the first stopper 20. When the connecting device is returned to the state of FIG. 9A in the releasing process, the column holder 11 may be left staying on the right side of FIG. 9A due to an insufficient strength of the compression spring 17 or the like. However, the projection 23 of the second stopper 21 abuts against the locking portion 19 of the guide 14 so as to pullingly move the column holder 11 to a desired position.

According to the embodiment, as well, the action of the compression spring 17 permits the driver 15 on only one side to first connect the upstream first fitting 3 and the separation column 2 and then to connect the separation column 2 and the downstream second fitting 4. In the releasing process, as well, the compression spring permits the driver to first disconnect the downstream second fitting 4 from the separation column 2 and then to disconnect the upstream first fitting 3 from the separation column 2. Further, the stoppers 20 and 21 enable the highly reproducible operation.

Just as in the first embodiment, provided that in the state shown in FIG. 9A, L1 denotes a distance between the seal portion 9 and the seal portion 7, L2 denotes a distance between the seal portion 10 and the seal portion 8, and that in the state shown in FIG. 9C, L6 denotes a distance between the locking portion 18 and the projection 22, and L7 denotes a distance between the locking portion 19 and the projection 23. In the step of FIG. 9A→FIG. 9B of the connecting process or in the step of FIG. 9B→FIG. 9A of the releasing process, the device provides L1=L7, L2=L6 by operating with the compression spring 17 maintaining the distance L2. Provided that L3 (=|L4−L5|) denotes a displacement of the compression spring 17, the seal portion 10 contacts with the seal portion 8 when L2=L3. By defining the range of movement (stroke) L of the driver 15 as L≤L1+L2, the driver can further apply a force to the components in contact state so as to obtain the pressure tightness at the contact portion.

According to the configuration of the seventh embodiment, the second fitting is immovable and hence, the downstream pipe can be shortened and the dead volume on the downstream side can be reduced.

Embodiment 8

This embodiment illustrates an example of a separation column connecting device where the column holder and the guide are unified.

Figure 10A:
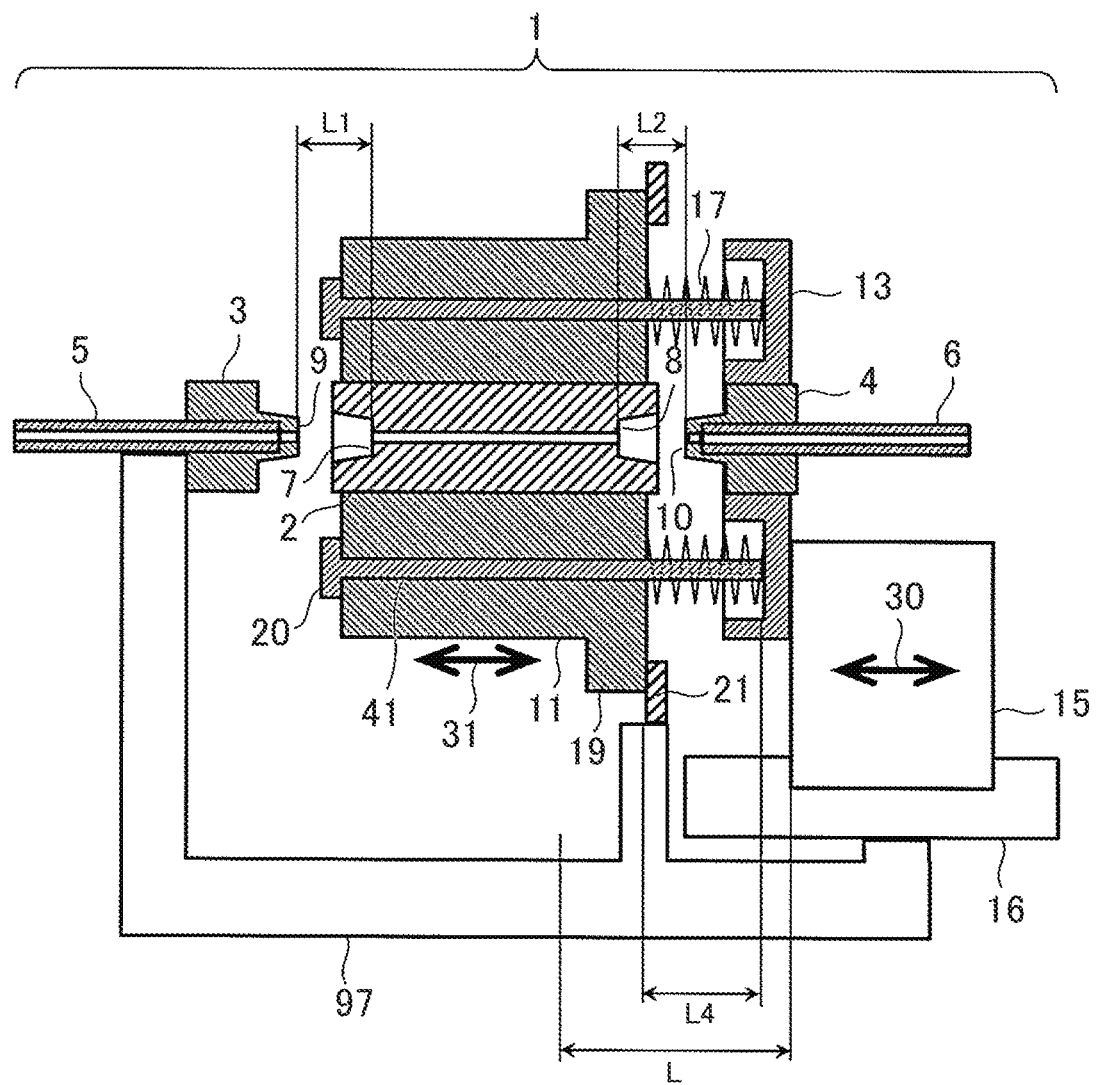
FIG. 10A is a schematic fragmentary sectional view showing an example of a separation column connecting device in the open position.
Figure 10B:
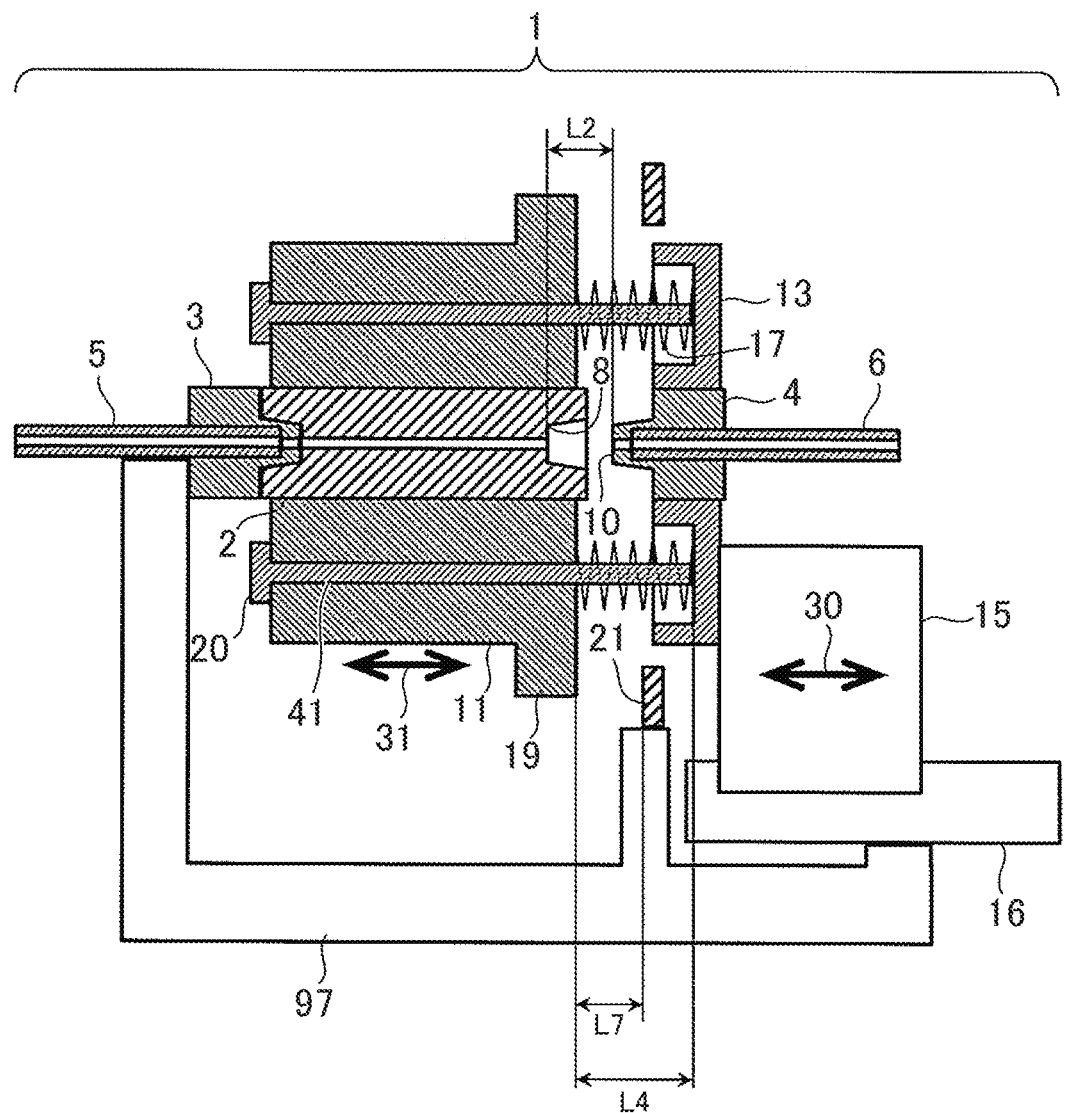
FIG. 10B is a schematic fragmentary sectional view showing the example of the separation column connecting device in the first connection position.
Figure 10C:
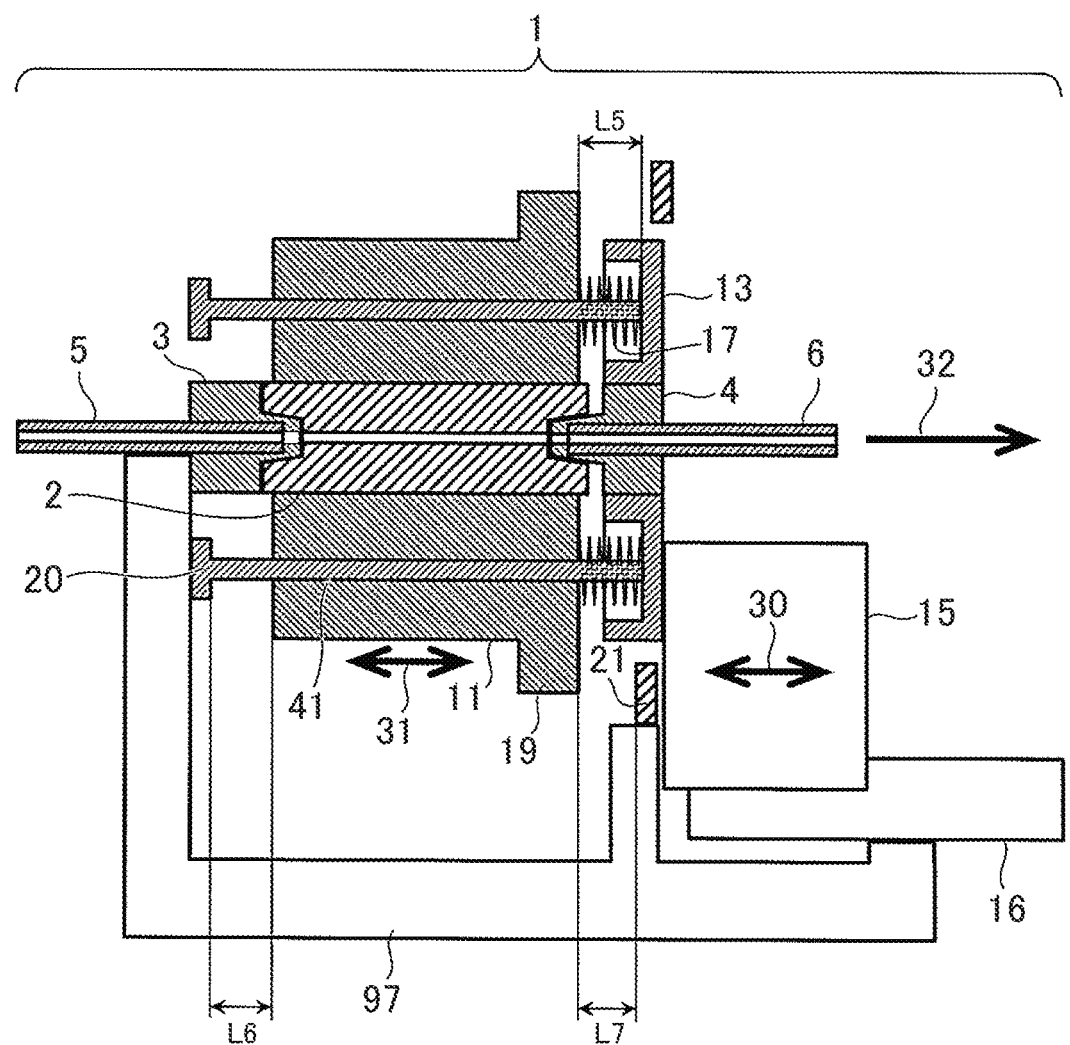
FIG. 10C is a schematic fragmentary sectional view showing the example of the separation column connecting device in the connection position.

FIGS. 10A to 10C are schematic sectional views showing an exemplary configuration of a separation column connecting device according to an eighth embodiment. FIG. 10A shows the "open position" where the first fitting 3 and the second fitting 4 are separate from the separation column 2. FIG. 10B shows the "first fitting connection position" where the first fitting 3 is connected to the separation column 2. FIG. 10C shows the "connection position" where the first fitting 3 and the second fitting 4 are connected to the separation column 2.

Since the separation column connecting device 1 is basically configured almost the same way as that shown in FIGS. 2A to 2D, the description is made on differences. A feature of this embodiment is that the column holder 11 incorporates a guide function as a counterpart of a guide shaft 41 for guiding the separation column 2 in linear movement as indicated by the arrow 31. The rail 16, the second stopper 21, the first fitting 3 and the like are mounted on a base 97 and are immovable as fixed at places. In the separation column connecting device 1 of the embodiment, the base 97, the rail 16 and the second stopper 21 are integrated to constitute the body member.

The base 97 is equivalent to what integrates the first fitting holder 12 and the second stopper 21 of the first embodiment. The separation column 2 is fixed centrally of the column holder 11 so formed as to enclose the separation column. The column holder 11 is formed with a plurality of through holes allowing for the penetration of the guide shafts 41. The second fitting 4 connected with the downstream pipe 6 is fixed centrally of the second fitting holder 13 so formed as to enclose the second fitting. The plural guide shafts 41 inserted through the through holes of the column holder 11 are fixed to the second fitting holder 13, which is driven by the driver 15 which moves along the rail 16 in the direction of the arrow 30. The guide shaft 41 has the compression spring 17 as the elastic body fitted around its portion exposed between the column holder 11 and the second fitting holder 13. The compression spring 17 acts to forcibly separate the column holder 11 and the second fitting holder 13 from each other. The guide shaft 41 is formed with the first stopper 20 at a distal end thereof. An upstream surface of the column holder 11 serves as the locking portion to contact with the first stopper 20. The column holder 11 is prevented from dropping off from the guide shaft 41 as locked by the first stopper 20.

From the "open position" shown in FIG. 10A, the second fitting holder 13 is moved toward the left by the driver 15 along with the arrow 30. Then, the second fitting holder 13 and the column holder 11 are unitarily moved leftward so that the seal portion 9 of the first fitting 3 is connected to the upstream seal portion 7 of the separation column 2. Thus, the state shown in FIG. 10B (first fitting connection position) is established. At this time, the compression spring 17 interposed between the second fitting holder 13 and the column holder 11 acts to keep the separation column 2 unconnected with the second fitting 4. Subsequently, when the driver 15 further moves the second fitting holder 13 toward the left, the second fitting holder 13 approaches the column holder 11 at a stop while tightening the compression spring 17. Finally, the seal portion 10 of the second fitting 4 is connected to the downstream seal portion 8 of the separation column 2. Thus, the state shown in FIG. 10C (connection position) is established.

The separation column 2 set on the column holder 11 in the state of FIG. 10A is sequentially connected with the first fitting 3 and the second fitting 4 in the order indicated by FIG. 10A→FIG. 10B FIG. 10C (connecting process). In a case where the replacement of the separation column 2 is necessary, the separation column 2 is released in the order indicated by FIG. 10C→FIG. 10B→FIG. 10A (releasing process). The releasing process is basically the inverse operation of the connecting process. When the driver 15 returns the second fitting 4 toward the right, the compression spring 17 first forces the second fitting 4 to be separated from the separation column 2 and thereafter, the first fitting 3 is separated from the separation column 2. Just as in the first embodiment, the first stopper 20 and the second stopper 21 function to reproducibly return the individual components to the positions shown in FIG. 9A in the releasing process.

Just as in the first embodiment, provided that at the open positions shown in FIG. 10A, L1 denotes a distance between the seal portion 9 and the seal portion 7, L2 denotes a distance between the seal portion 10 and the seal portion 8, and L4 denotes a length of the compression spring 17. Further provided that at the connection positions shown in FIG. 10C, L5 denotes a length of the compression spring, L6 denotes a distance between the first stopper 20 and the column holder 11, and L7 denotes a distance between the column holder 11 and the second stopper 21. In the step of FIG. 10A→FIG. 10B of the connecting process or in the step of FIG. 10B→FIG. 10A of the releasing process, the device of this embodiment also provides L1=L7, L2=L6 by operating with the compression spring 17 maintaining the distance L2. Provided that L3 (=|L4−L5|) denotes a displacement of the compression spring 17 between the open position and the connection position, the seal portion 10 contacts with the seal portion 8 when L2=L3. By defining the range of movement (stroke) L of the driver 15 as L≥L1+L2, the driver can further apply a force to the components in contact state so as to obtain the pressure tightness at the contact portion.

According to the configuration of the eighth embodiment, the column holder and the guide are unified. Hence, the embodiment can achieve cost reduction and structure simplification.

Embodiment 9

This embodiment illustrates a separation column connecting device configured to include a driver employing a motor.

Figure 11:
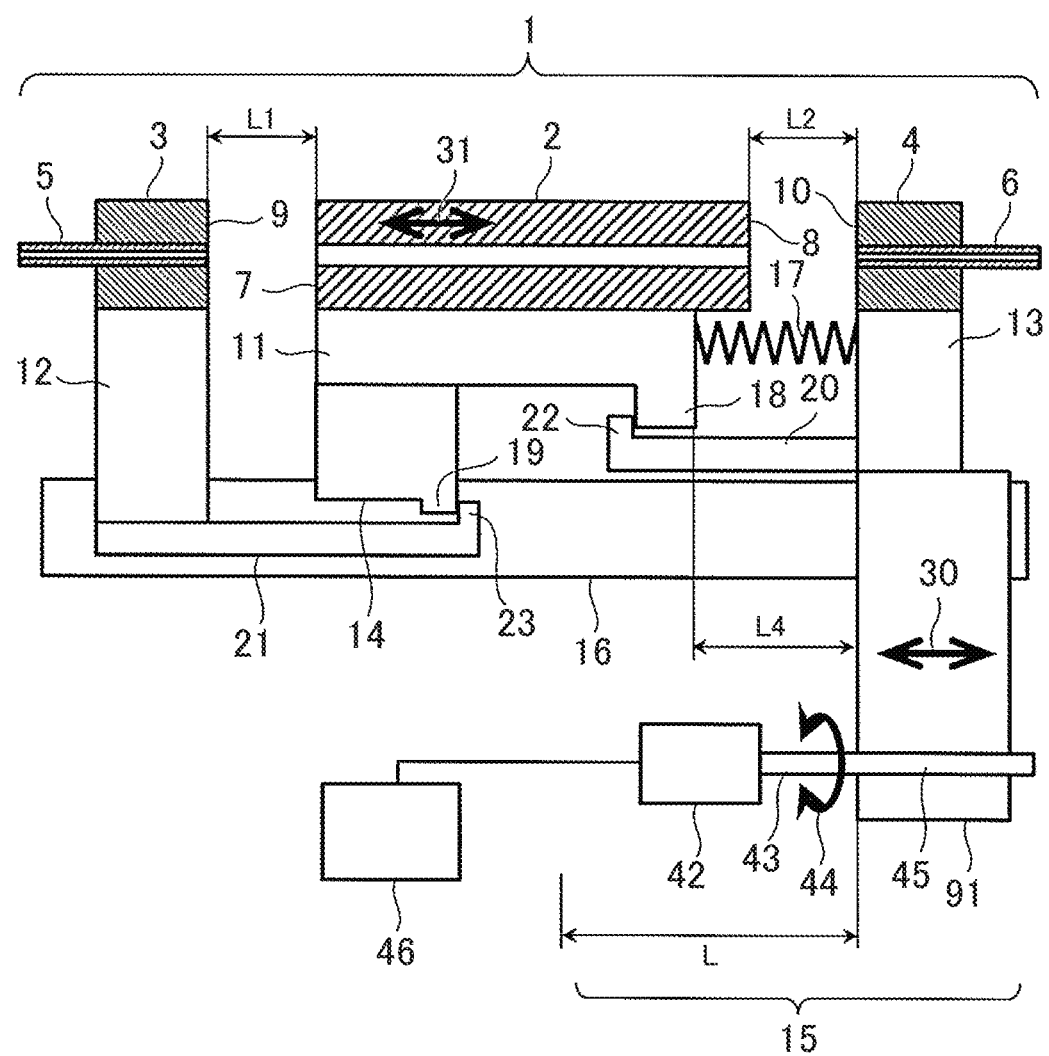
FIG. 11 is a schematic sectional view showing an example of a separation column connecting device.

FIG. 11 is a schematic sectional view showing an exemplary configuration of a separation column connecting device 1 according to a ninth embodiment. Since the separation column connecting device is basically configured almost the same way as that shown in FIGS. 2A to 2D, the description is made on differences. The figure shows only the "open position" for simplicity's sake.

In this embodiment, a motor 42, a rotary shaft 43 and a stage 91 constitute the driver 15. The rotary shaft 43 is rotated along with an arrow 44 by transmitting the rotation of the motor 42 to the rotary shaft 43. The rotary shaft 43 includes a feed screw 45, the rotation of which is converted to a linear movement as indicated by the arrow 30 by means of a counterpart screw (not shown) of the stage 91. The number of revolutions, torque, timing of rotation and the like of the motor 42 are controlled by a controller 46. In a case where the downsizing (power saving) of the motor 42 is desired, a large power can be obtained even from a small motor 42 by interposing reduction gears between the motor 42 and the rotary shaft 43.

The configuration of the ninth embodiment provides automatic connection and disconnection of the separation column. The device can also be adapted for manual connection and disconnection of the separation column by replacing the motor with a manual rotary member.

Embodiment 10

A tenth embodiment illustrates a separation column connecting device configured to prevent the feed screw of the driver from loosening by itself.

In the separation column connecting device 1 as shown in FIG. 11, the motor 42 needs to be kept energized at a desired torque in order to maintain the sealing performance of the connection portion. However, this entails problems of increased power consumption and heat generation of the motor. As a measure against this problem, it is desirable to configure the device to prevent the feed screw 45 from loosening when the motor 42 stops rotating. A condition that prevents the screw from loosening by itself is expressed by an equation 1.

$$F \cdot \tan(\rho - \theta) = F \cdot \frac{\tan\rho - \tan\theta}{1 + \tan\rho \cdot \tan\theta} > 0 \qquad \text{[Equation 1]}$$

Provided here that F denotes an axial force (N); tan ρ=μ'=μ/cos α; μ' and μ denote a frictional coefficient; a denotes a half angle (°) of screw thread; and θ denotes a lead angle (°). If the frictional coefficient of the screw μ' is on the order of 0.1, for example, the equation 1 dictates the need for defining a condition as θ<5.7°. Provided that d (mm) denotes an effective diameter of the screw, and P (mm) denotes a pitch of the screw, the following equation 2 is established.

$$\tan\theta = \frac{P}{\pi d} \quad \text{[Equation 2]}$$

If d=8 mm, P=1.5 mm, for example, θ=3.42° is obtained from the equation 2, satisfying the condition. In the separation column connecting device of this embodiment, the feed screw 45 of the driver 15 satisfies the conditions of the above equations 1 and 2.

A separation column connecting device adapted to reduce the power consumption is implemented by the configuration of the tenth embodiment.

Embodiment 11

An eleventh embodiment illustrates a configuration of a manually operable driver.

Figure 12A:
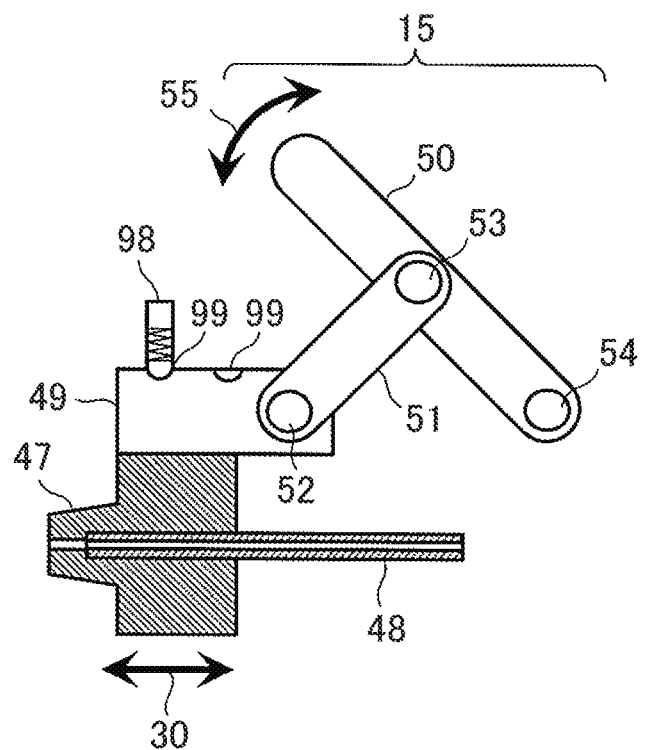
FIG. 12A is a schematic diagram showing an exemplary configuration of a driver in the open position.
Figure 12B:
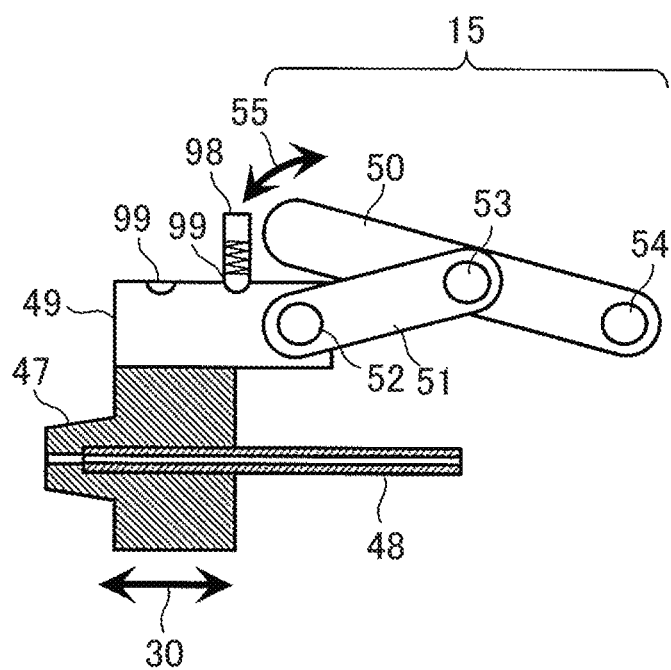
FIG. 12B is a schematic diagram showing the exemplary configuration of the driver in the connection position.

FIG. 12A and FIG. 12B are schematic sectional views showing an exemplary configuration of a driver of the separation column connecting device. FIG. 12A shows the "open position", while FIG. 12B shows the "connection position". Except for the driver, the separation column connecting device is configured substantially the same way as that shown in FIGS. 2A to 2D.

According to the embodiment, a lever 50, an arm 51 and the like constitute the driver 15. When the lever 50 is rotated about a fixed fulcrum 54 along with an arrow 55, the fulcrums 52, 53 are rotated to vary the angle of the arm 51 so that the fulcrum 52 is changed in position. The positional change of the fulcrum 52 enables the linear movement of a fitting 47, a fitting holder 49 and a pipe 48 as indicated by the arrow 30. A plunger 98 incorporating a spring therein may be used in combination with the fitting holder 49 formed with holes 99 respectively corresponding to the "open position" and the "connection position" so that the plunger can play the role of a stopper for fixing the fitting holder at the respective positions. The stopper for fixing the fitting holder is not limited to the above but may be any member that can fix the fitting holder at the respective positions.

The eleventh embodiment enables the connection and disconnection of the separation columns by means of the simple mechanism using the lever.

Embodiment 12

This embodiment illustrates a separation column connecting device having a configuration where a tension spring is used for first connecting the first fitting to the separation column.

Figure 13A:
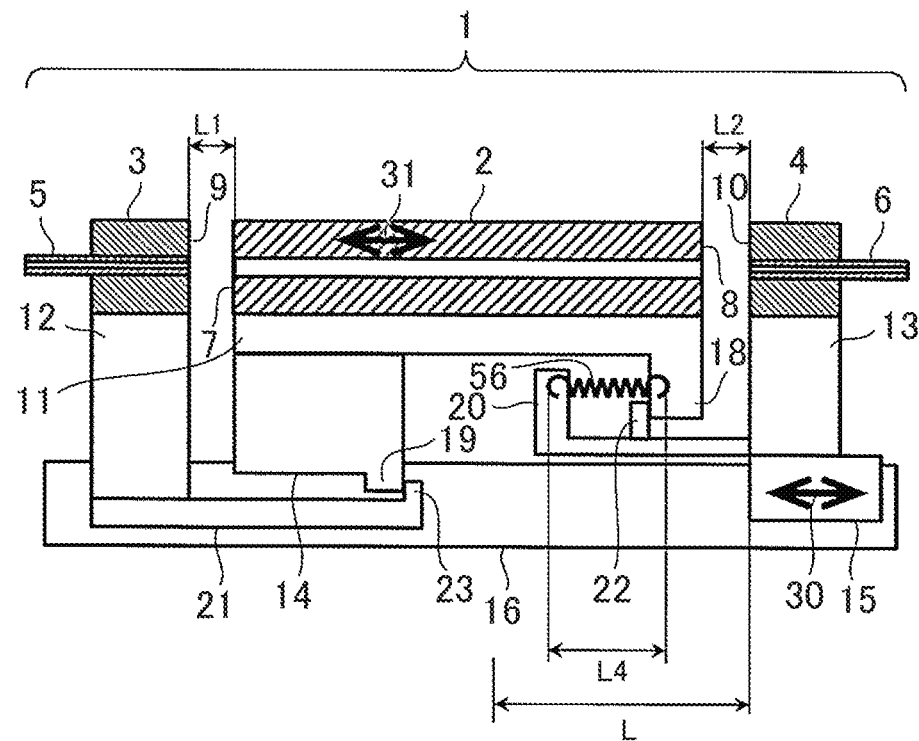
FIG. 13A is a schematic fragmentary sectional view showing an example of a separation column connecting device in the open position.
Figure 13B:
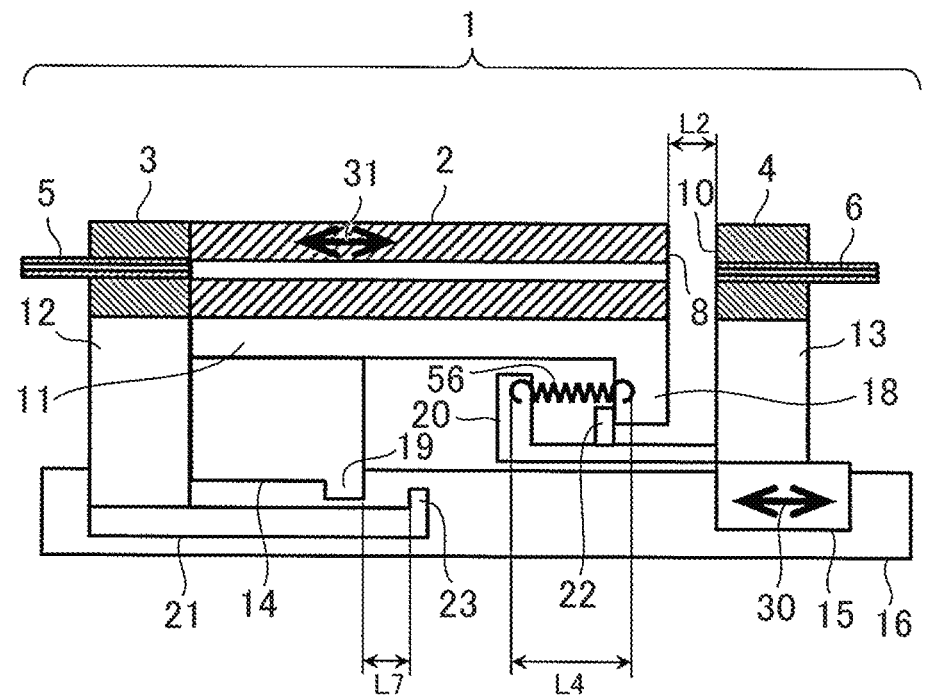
FIG. 13B is a schematic fragmentary sectional view showing the example of the separation column connecting device in the first fitting connection position.
Figure 13C:
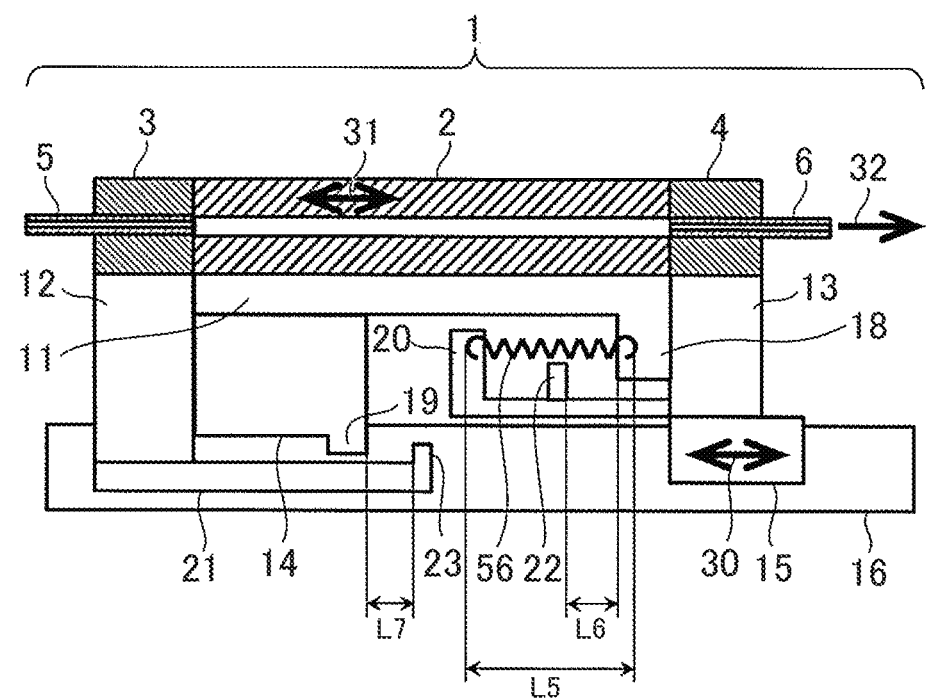
FIG. 13C is a schematic fragmentary sectional view showing the example of the separation column connecting device in the connection position.

FIGS. 13A to 13C are schematic fragmentary sectional views showing an exemplary configuration of a separation column connecting device according to a twelfth embodiment. FIG. 13A shows the "open position" where the first fitting and the second fitting are separate from the separation column 2. FIG. 13B shows the "first fitting connection position" where the first fitting 3 is connected to the separation column 2. FIG. 13C shows the "connection position" where the first fitting 3 and the second fitting 4 are connected to the separation column 2.

Since the separation column connecting device 1 is basically configured almost the same way as that shown in FIGS. 2A to 2D, the description is made on differences. The embodiment employs a tension spring 56 as the elastic body for first connecting the first fitting 3 to the separation column 2. The tension spring 56 is disposed at place between a distal end of a first stopper 20 connected to the second fitting holder 13 and the locking portion 18 of the column holder 11 which is located closer to the second fitting holder 13 than the distal end of the first stopper. While the tension spring 56 applies a tensile force between the distal end of the first stopper 20 and the locking portion 18 of the column holder 11, the movement of these components is limited by the projection 22 disposed at the first stopper 20. As a result, the downstream seal portion 8 of the separation column 2 and the seal portion 10 of the second fitting 4 are kept spaced apart by the distance L2.

While the tension spring 56 is disposed between the first stopper 20 and the column holder 11, the second fitting holder may be unified with the first stopper 20 so as to double as the first stopper. In this embodiment, as well, the elastic body is considered as being located between the column holder and the second fitting holder.

The separation column 2 set on the column holder 11 in the state shown in FIG. 13A is first connected with the first fitting 3 as indicated by FIG. 13A→FIG. 13B→FIG. 13C and thereafter, connected with the second fitting 4 (connecting process). In the connecting process, the second fitting 4 carried on the second fitting holder 13 is moved by the driver 15 toward the first fitting 3 along the rail 16. Then, the separation column 2 is moved toward the first fitting 3 as maintaining the distance L2 to the second fitting 4 because of the force of the tension spring 56. The seal portion 9 of the first fitting 3 is connected to the seal portion 7 of the separation column 2 by the movement of the separation column 2 so that the state of FIG. 13B (first fitting connection position) is established. Subsequently when the driver 15 further moves the second fitting holder 13, the tension spring 56 is stretched, finally connecting the seal portion 8 of the separation column 2 with the seal portion 10 of the second fitting 4. Thus, the state of FIG. 13C (connection position) is established.

The connecting process performed in the order of FIG. 2A→FIG. 2B→FIG. 2C is as described above. The releasing process performed in the order of FIG. 2C→FIG. 2B→FIG. 2A is basically the inverse operation of the connecting process. When the driver 15 returns the second fitting 4 to place, the second fitting 4 is first separated from the separation column 2 due to the action of the tension spring 56. Subsequently, the first fitting 3 is separated from the separation column 2. The relations among the distances L1 to L7 are the same as those of the first embodiment.

The configuration of the twelfth embodiment, just as that of the first embodiment, permits the fitting driver on only one side to accomplish the operation of connecting and disconnecting the separation column where the downstream pipe is first disconnected from the separation column and where the upstream pipe is first connected to separation column.

Embodiment 13

This embodiment illustrates a separation column connecting device having a configuration where a combination of cylinder and piston is used for first connecting the first fitting to the separation column.

Figure 14:
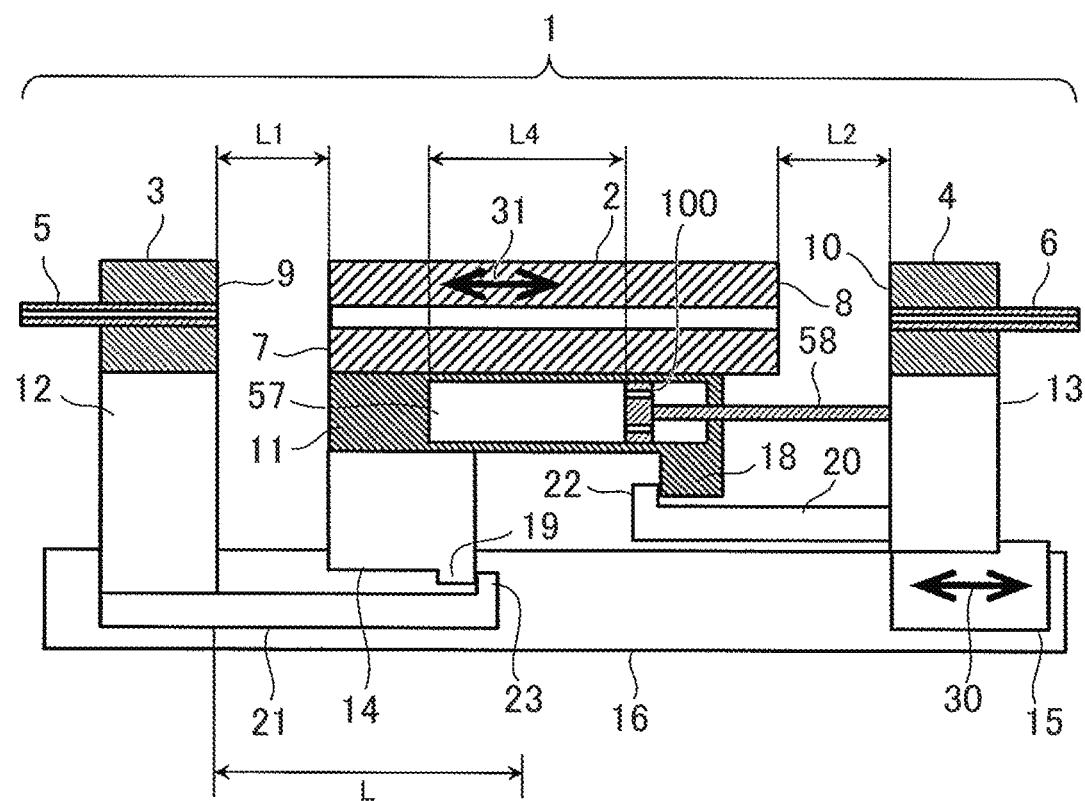
FIG. 14 is a schematic fragmentary sectional view showing an example of a separation column connecting device.

FIG. 14 is a schematic fragmentary sectional view showing an exemplary configuration of a separation column connecting device 1 according to a thirteenth embodiment. Since the separation column connecting device is basically configured almost the same way as that shown in FIGS. 2A to 2D, the description is made on differences. The figure shows only the "open position" for simplicity's sake.

This embodiment employs a mechanism consisting of a cylinder filled with a fluid such as gas or liquid and a piston as the elastic body for first connecting the first fitting 3 to the separation column 2. A force for first pressing the first fitting 3 against the separation column 2 is produced by a piston 58 movably compressing the fluid in a cylinder 57. In the case of using a fluid having high viscosity such as a liquid, the piston 58 may be formed with an orifice 100 extending therethrough from a front side to a back side thereof, although the orifice is not necessarily required if the fluid such as a gas has low viscosity. The attenuation performance of the fluid depends upon the conductance of the orifice 100. Further, the orifice 100 may also incorporate a check valve therein.

The configuration of the thirteenth embodiment, just as that of the first embodiment, permits the fitting driver on only one side to accomplish the operation of connecting and disconnecting the separation column where the downstream pipe is first disconnected from the separation column and where the upstream pipe is first connected to the separation column.

Embodiment 14

This embodiment illustrates a separation column connecting device having a configuration which includes a column oven for providing temperature control of the separation column, the fittings and the pipes.

Figure 15:
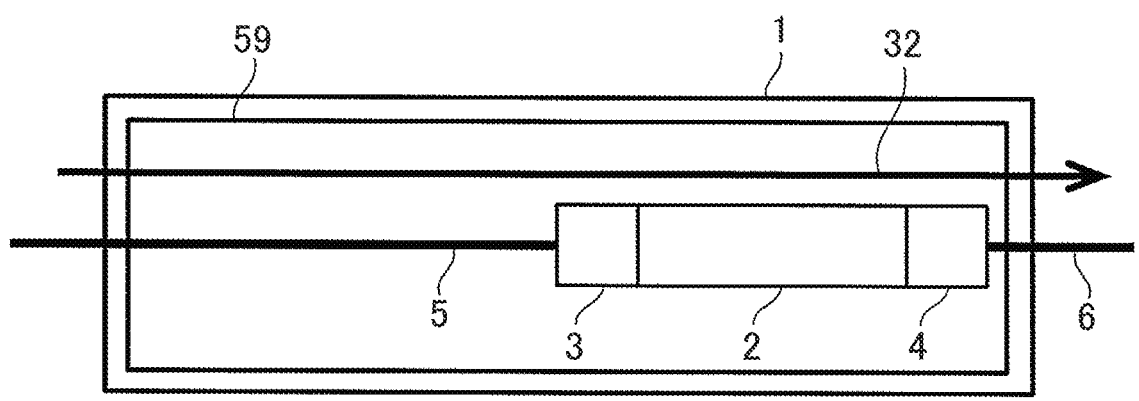
FIG. 15 is a schematic diagram showing an example of a separation column connecting device.

FIG. 15 is a schematic diagram showing an exemplary configuration of a separation column connecting device 1 according to a fourteenth embodiment. Since the separation column connecting device is basically configured almost the same way as that shown in FIGS. 2A to 2D, the description is made on differences. The figure shows only the "connection position" for simplicity's sake.

The embodiment includes a column oven 59 as a temperature control part for controlling the temperature of the separation column 2, the first fitting 3 and the second fitting 4. The viscosity of a solution in the separation column is lowered by raising the temperature of the separation column 2 to several dozen degrees Celsius whereby the throughput of analysis can be increased. In order to obviate the generation of temperature distribution or temperature variations in the separation column 2, it is desirable that the temperature of the pipe 5 and the pipe 6 is also controlled by the column oven 59, as shown in FIG. 15.

The configuration of the fourteenth embodiment provides analysis featuring high reproducibility and high throughput.

Embodiment 15

This embodiment illustrates a separation column connecting device having a configuration which includes the temperature control part for controlling the temperature of the separation column, the fittings and the pipes.

Figures 16, 17:
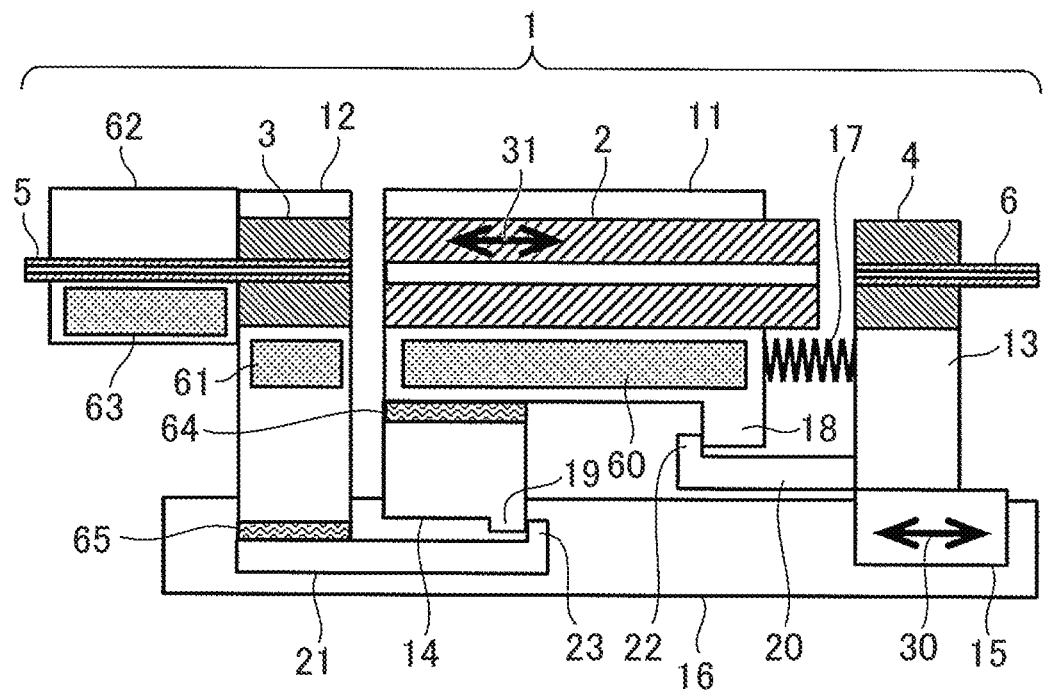
FIG. 16 is a schematic diagram showing an example of a separation column connecting device.
FIG. 17 is a schematic fragmentary sectional view showing an exemplary configuration of a separation column connecting device.

FIG. 16 is a schematic fragmentary sectional view showing an exemplary configuration of a separation column connecting device 1 according to a fifteenth embodiment. Since the separation column connecting device is basically configured almost the same way as that shown in FIGS. 2A to 2D, the description is made on differences. The figure shows only the "open position" for simplicity's sake.

The embodiment includes temperature control parts 60, 61 and 63 for controlling the temperature of the separation column 2, the first fitting 3 and the pipe 5. The temperature control parts 60, 61 and 63 each include a heater, a sensor for temperature monitoring and the like, and provide temperature control by way of an external control unit (not shown). The temperature control parts 60, 61 and 63 use the column holder 11, the first fitting holder 12, and a pipe holder 62 as heat blocks. In a case where the transfer of the controlled heat to other members is unwanted, heat insulating materials 64 and 65 may be disposed as shown in FIG. 16. Incidentally, the device may also be provided with means for controlling the temperature of the second fitting 4 and the pipe 6.

The configuration of the fifteenth embodiment provides not only the analysis featuring high reproducibility and high throughput similarly to the fourteenth embodiment, but also heat insulation for the driver and the like.

Embodiment 16

This embodiment illustrates a separation column connecting device having a configuration where the first fitting and the second fitting have different shapes.

FIG. 17 is a schematic sectional view showing an exemplary configuration of a separation column connecting device according to a sixteenth embodiment. The figure shows examples of the separation column 2, the first fitting 3 and the second fitting 4. Since the separation column connecting device is basically configured almost the same way as that shown in FIGS. 2A to 2D, the description is made on differences.

The separation column 2 includes the flat seal portions 7 and 8. The first fitting 3 includes the seal portion 9 made of the doughnut shaped protrusion 40 at the distal end thereof. The second fitting 4 includes the flat seal portion 10. With the same pressing force, as described in the foregoing, the seal portion 9 having the doughnut shaped protrusion 40 has higher pressure tightness than the flat seal portion 10. The inside of the separation column 2 is filled with the filler 33. The first fitting 3 makes a component having the higher pressure tightness because the pressure is higher at the upstream side than at the downstream side.

The configuration of the sixteenth embodiment enables the upstream side to achieve the higher pressure tightness than the downstream side when pressed with the same force.

Embodiment 17

A seventeenth embodiment illustrates a separation column connecting device having a configuration where the first fitting and the second fitting are made of different materials.

It is generally known that the seal portion of the separation column and the ferrule which are made of a hard material such as metal exhibit higher pressure tightness than those made of resin. Among the resin materials, a polyetheretherketone resin or the like is harder than a fluorine resin provides higher pressure tightness. In order to impart higher pressure tightness to the first fitting 3 just as in the sixteenth embodiment, the embodiment uses different materials for forming the first fitting 3 and the second fitting 4. In practice, it is desirable to use a harder material for forming the seal portion 9 of the first fitting 3 than that for forming the seal portion 10 of the second fitting 4.

The configuration of the seventeenth embodiment, similarly to that of the sixteenth embodiment, enables the upstream side to achieve higher pressure tightness than the downstream side when pressed with the same force.

Embodiment 18

An eighteenth embodiment illustrates a separation column connecting device having a configuration where a spring is disposed between the fitting and the fitting holder.

Figure 18:
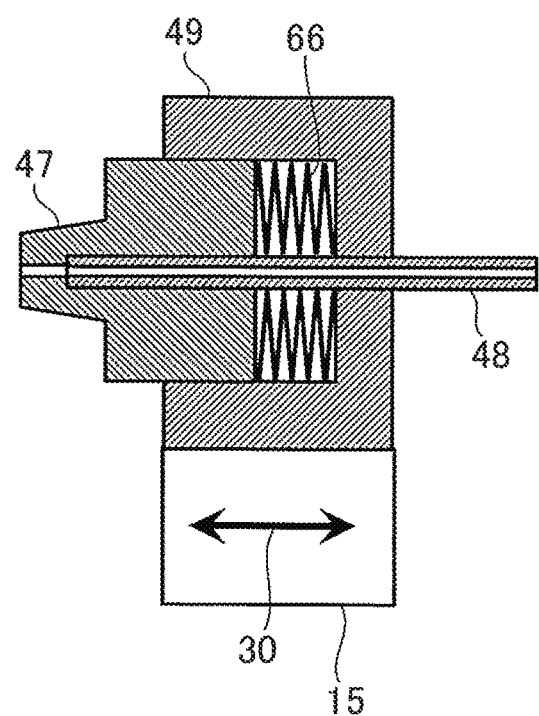
FIG. 18 is a schematic sectional view showing an example of an area around a fitting and a fitting holder.

FIG. 18 is a schematic sectional view showing an area around a fitting and a fitting holder according to the embodiment. Since the separation column connecting device is basically configured almost the same way as that shown in FIGS. 2A to 2D, the description is made on differences. A feature of this embodiment is that a spring 66 is interposed between the fitting holder 49 moved by the driver 15 and the fitting 47. The fitting holder 49 includes a through hole, through which the pipe 48 connected to the fitting 47 is slidable through the through hole of the fitting holder.

The eighteenth embodiment is configured to press the fitting 47 against the separation column by means of the spring. The embodiment is adapted to prevent the application of an excessive force to the seal portion so as to extend the service lives of the fitting and the separation column.

Embodiment 19

This embodiment illustrates a separation column connecting device configured to use a pin for positioning and fixing the separation column and the column holder, and for positioning and fixing the fitting and the fitting holder.

Figure 19A:
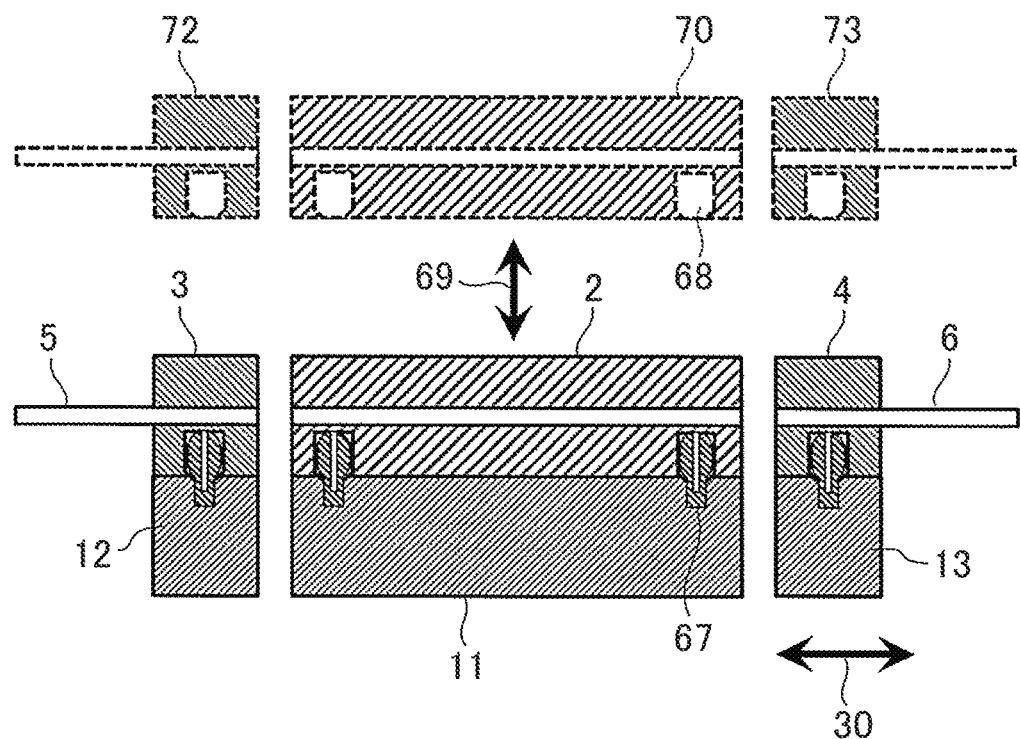
FIG. 19A is a schematic diagram showing an example of a positioning and fixing method for a separation column connecting device.
Figure 19B:
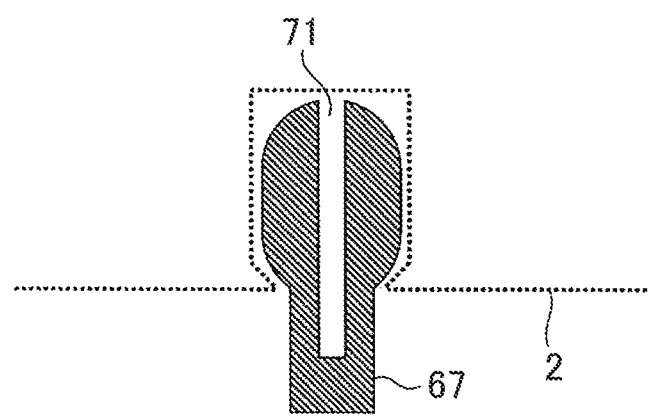
FIG. 19B is a schematic sectional view showing an example of a positioning and fixing pin.

FIG. 19A and FIG. 19B are schematic diagrams illustrating an example of a positioning and fixing method for a separation column connecting device according to a nineteenth embodiment. FIG. 19A is a schematic sectional view showing an area around the separation column 2. FIG. 19B is a schematic sectional view showing an example of a positioning and fixing pin 67. Since the separation column connecting device is basically configured almost the same way as that shown in FIGS. 2A to 2D, the description is made on differences.

The column holder 11, the first fitting holder 12 and the second fitting holder 13 have the pins 67 previously fixed therein by press fitting or using screw. Further, the separation column 2, the first fitting 3 and the second fitting 4 are formed with holes 68 for insertion of the pins 67. This permits the separation column 2 to be set on or released from the column holder 11 in conformity with the positions of the pins 67 fixed to the column holder as guided by the holes 68 in the separation column 2. The first fitting 3 and the second fitting 4 can also be positioned and set on the first fitting holder 12 and the second fitting holder 13 the same way as positioned by means of the pins 67. The pin 67 is formed with a slit 71 to be split into two parts at a distal end thereof and hence, is radially deformable through the elasticity thereof. The use of the deformable pin 67 enables the attachment and removal of the separation column, the first fitting and the second fitting to be done by uniaxially moving them between a retreat position 70 of the separation column, a retreat position 72 of the first fitting and a retreat position 73 of the second fitting, and the respective set positions thereof, as indicated by an arrow 69. When the pin 67 is inserted in the hole 68 having a smaller inlet diameter as shown in the figure, the pin is deformed thinner through the slit 71 thereof. Subsequently when the pin 67 is inserted to the depth of the hole 68, the pin 67 expands again to its original diameter so as to fix the separation column 2 in position. When the pin 67 is extracted, the pin 67 is easily extracted by being deformed the same way. All of the separation column 2, the first fitting 3 and the second fitting 4 need not be provided with the removably attaching structure using the pin 67.

The configuration of the nineteenth embodiment facilitates a maintenance work because the above components can be set in place by uniaxially moving them. What is more, in the case of automating a transporting operation for disposal of a used separation column or for setting a new separation column, the configuration of the embodiment features a small number of drive shafts, which leads to the cost reduction and the downsizing of the device.

Embodiment 20

This embodiment illustrates a separation column connecting device having a configuration where the separation column and the column holder, or the fitting and the fitting holder are positioned and fixed in place by means of a hinge.

Figure 20A:
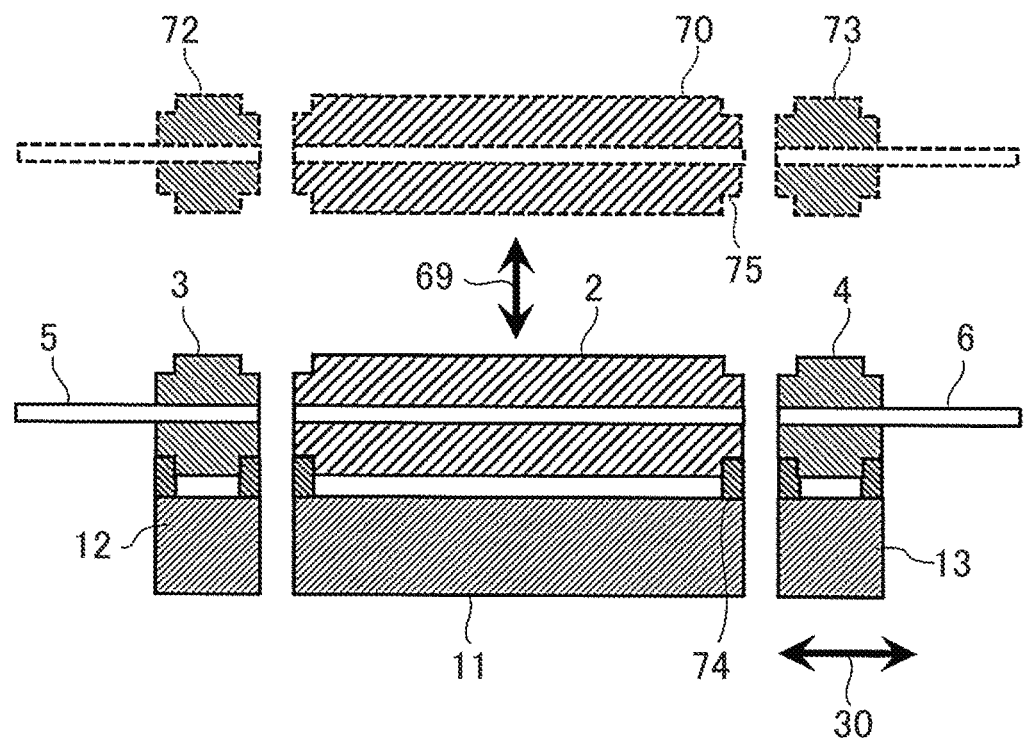
FIG. 20A is a schematic diagram illustrating a positioning and fixing method for a separation column connecting device.
Figure 20B:
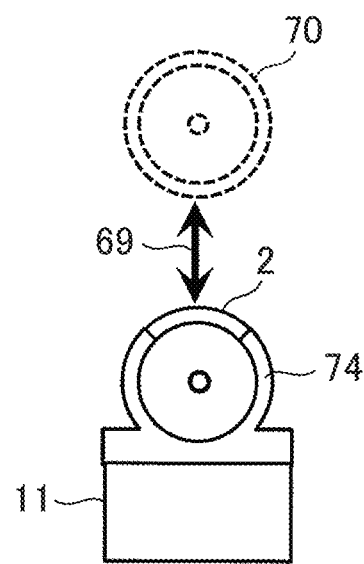
FIG. 20B is an illustrative diagram showing an example of a hinge configuration.

FIG. 20A and FIG. 20B are schematic diagrams illustrating an example of a positioning and fixing method for a separation column connecting device according to a twentieth embodiment. FIG. 20A is a schematic sectional view showing an area around the separation column 2. FIG. 20B is a diagram showing an exemplary configuration of a hinge 74 of FIG. 20A as seen from the right or left side thereof. Since the separation column connecting device is basically configured almost the same way as that shown in FIGS. 2A to 2D, the description is made on differences.

The hinges 74 are previously fixed to the column holder 11, the first fitting holder 12 and the second fitting holder 13 by means of screw or the like. Further, the column 2, the first fitting 3 and the second fitting 4 are formed with a cylindrical portion 75 for receiving the hinge 74, respectively. This permits the separation column 2 to be set on or released from the column holder 11 in conformity with the positions of the hinges 74 fixed to the column holder 11 as guided by the cylindrical portions 75 in the separation column 2. The first fitting 3 and the second fitting 4 can also be positioned and set in place the same way by means of the hinge 74. The hinge 74 can be opened and closed through elastic deformation of the material. Just as in the nineteenth embodiment, the use of the deformable hinge 74 enables the attachment and removal of the separation column, the first fitting and the second fitting to be done by uniaxially moving them between the retreat position 70 of the separation column, the retreat position 72 of the first fitting and the retreat position 73 of the second fitting, and the respective set positions thereof, as indicated by the arrow 69. Incidentally, all of the separation column 2, the first fitting 3 and the second fitting 4 need not be provided with the removably attaching structure using the hinge 74.

Just as that of the nineteenth embodiment, the configuration of the twentieth embodiment enables the above components to be set in place by uniaxially moving them.

Embodiment 21

This embodiment illustrates a separation column connecting device having a configuration where the connection between the separation column and the fitting is accomplished by using taper portions provided at the individual components as guides.

Figure 21:
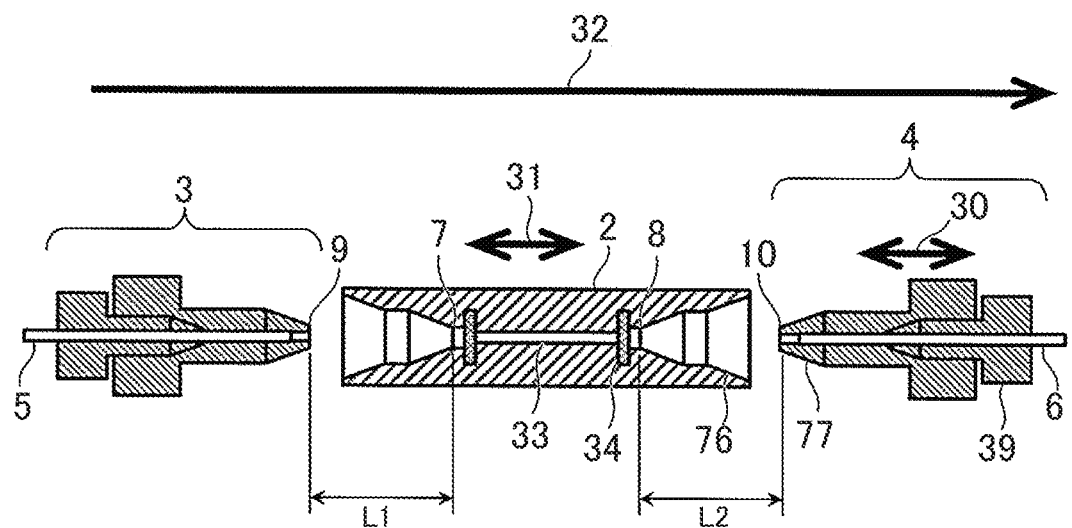
FIG. 21 is a schematic sectional view showing an exemplary configuration of a separation column connecting device.

FIG. 21 is a schematic sectional view showing an exemplary configuration of a separation column connecting device according to a twenty-first embodiment. The figure shows examples of the separation column 2, the first fitting 3 and the second fitting 4. Since the separation column connecting device is basically configured almost the same way as that shown in FIGS. 2A to 2D, the description is made on differences. In this embodiment, the separation column 2 is formed with a taper portion 76 while the first fitting 3 and the second fitting 4 are each formed with a taper portion 77.

Even though the separation column and the first fitting or the second fitting are axially misaligned to a certain degree, the configuration of the twenty-first embodiment can accomplish the axially aligned connection of these components by using the taper portions thereof as guide.

Embodiment 22

This embodiment illustrates a separation column connecting device having a configuration where a buffer member is disposed between the column holder and the guide.

Figure 22:
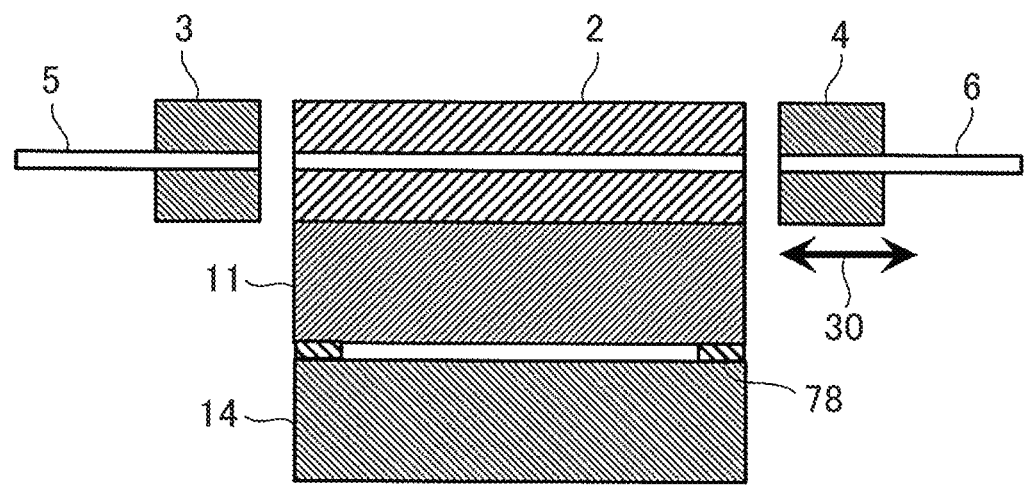
FIG. 22 is a schematic sectional view showing an exemplary configuration of a separation column connecting device.

FIG. 22 is a schematic sectional view showing an exemplary configuration of a separation column connecting device according to a twenty-second embodiment. The figure shows an area around the separation column 2. Since the separation column connecting device is basically configured almost the same way as that shown in FIGS. 2A to 2D, the description is made on differences.

In this embodiment, a buffer member 78 is disposed between the column holder 11 and the guide 14. Materials such as rubber, sponge, spring, and fluid damper are usable as the buffer member 78. The buffer member 78 may also be disposed at place between the separation column 2 and the column holder 11. Further, the buffer member may also be disposed at place between the fitting and the fitting holder, or between the fitting holder and the driver 15.

Even though the separation column and the first fitting or the second fitting are axially misaligned to a certain degree, the configuration of the twenty-second embodiment can accomplish the axial alignment between the separation column and the first fitting or the second fitting by way of the likelihood of the buffer member.

Embodiment 23

This embodiment illustrates a separation column connecting device which includes a sensor for detecting a solution and a sensor for detecting the position of a moving member and is capable of performing a sequence of moving the driver based on the detection information.

Figure 23:
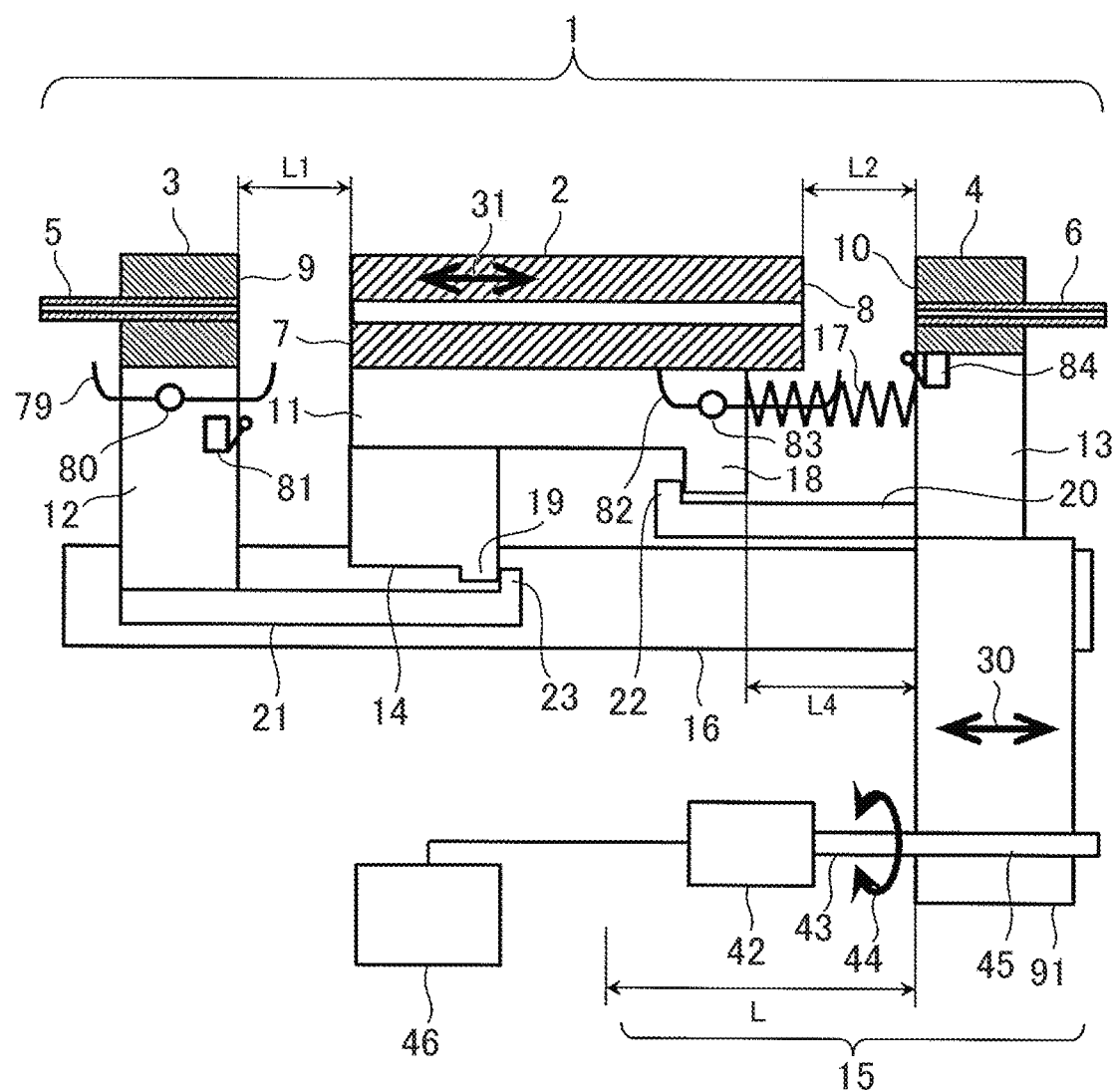
FIG. 23 is a schematic sectional view showing an example of a separation column connecting device.

FIG. 23 is a schematic fragmentary sectional view showing an exemplary configuration of a separation column connecting device 1 according to a twenty-third embodiment. Since the separation column connecting device is basically configured almost the same way as that shown in FIGS. 2A to 2D, the description is made on differences. The device of the embodiment includes a first tray 79 for recovering a solution flowing out from an outlet of the first fitting 3, and a first liquid sensor 80 for detecting the solution. The device further includes a second tray 82 for recovering the solution flowing out from an outlet of the separation column 2, and a second liquid sensor 83 for detecting the solution. The device further includes a first position sensor 81 for detecting the connection between the seal portion 7 and the seal portion 9, and a second position sensor 84 for detecting the connection between the seal portion 8 with the seal portion 10.

Figure 24:
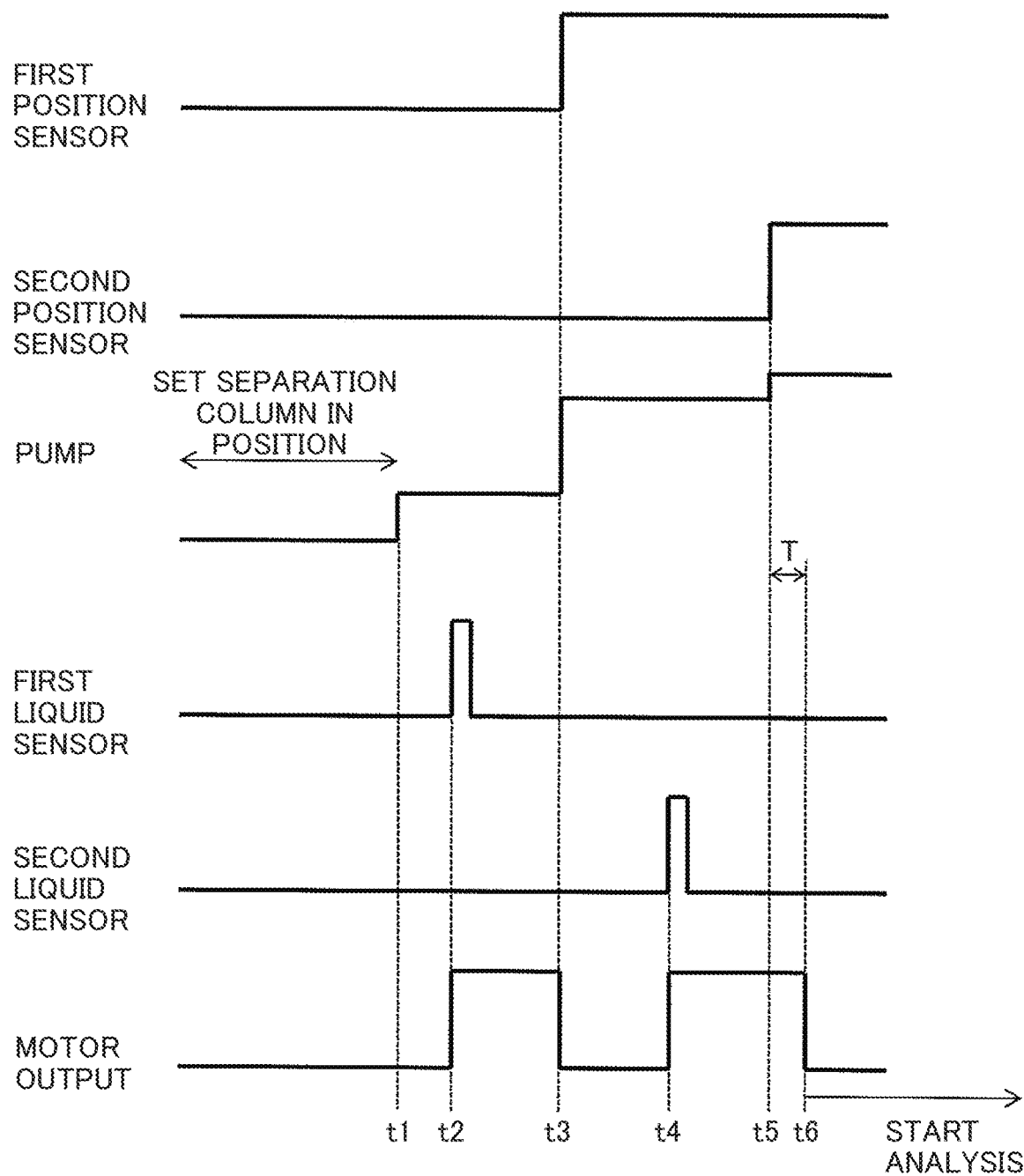
FIG. 24 is a chart showing an exemplary time sequence of analysis.

FIG. 24 is an explanatory chart showing an exemplary time sequence of analysis using the separation column connecting device of the embodiment. In the open position after the separation column 2 is set on the column holder 11, the pump 29 starts to feed liquid (t1). At this time, the liquid is not fed to the separation column 2 and hence, the flow rate of the pump 29 may be low. When the pump continues to feed the liquid, a certain amount of solution flowing out from the outlet of the first fitting 3 accumulates in the first tray 79. The liquid sensor 80 responds to the solution accumulation and the output of the motor 42 of the driver 15 is turned on (t2). When the motor 42 keeps running to bring the seal portion 7 of the separation column 2 and the seal portion 9 of the first fitting 3 into connection, the first position sensor 81 responds to this. The pump 29, the flow rate of which is increased, feeds the liquid to the separation column 2 (t3). Since the liquid is fed to the separation column 2 having high flow path resistance, the feeding time can be shortened by feeding the liquid at high flow rate. However, it is not necessarily required to increase the flow rate at Step t3. At this time, the output of the motor 42 is turned off. In this state, the first fitting 3 and the separation column 2 are maintained in connection only by the force of the compression spring 17. It does not matter if an upstream pressure of the separation column 2, which is dependent upon the flow rate, is at such a level as to allow the compression spring 17 to establish airtight seal.

When the liquid feeding to the separation column 2 is continued, a certain amount of solution flowing out from the outlet of the separation column 2 accumulates in the second tray 82. The second liquid sensor 83 responds to the solution accumulation so that the output of the motor 42 is turned on again (t4). When the motor 42 keeps running to bring the seal portion 8 of the separation column 2 and the seal portion 10 of the second fitting 4 into connection, the second position sensor 84 responds to this. The flow rate of the pump 29 is set to an analysis condition (t5). After the lapse of T seconds, the output of the motor is turned off (t6). By turning off the output of the motor after the lapse of T seconds, it is ensured that the motor 42 is rotated with a desired torque so as to apply a sufficient pressing force to the individual seal portions. The motor outputs set at Steps t2 and t4 may be the same or not. In a case where the power consumption of the motor 42 or heat generation by the motor 42 causes no problems, it is not necessary to turn off the output of the motor at Step t3 or t6.

According to this embodiment, the potential risk of air invasion into the flow path can be minimized by taking the sequence where the first fitting 3 is connected to the separation column 2 or the separation column 2 is connected with the second fitting 4 while allowing the solution to flow out and detecting the outflow. For the detection of the solution or the position, not only the contact type sensors shown in FIG. 23 but also an optical sensor and the like are usable. If an elution time of the solution from the first fitting or the separation column can be derived from a relation between a pumping rate and an inside diameter of the pipe, the liquid sensor may be dispensed with. If the position of the fitting or the position of the column can be derived from a relation of a motor rotation speed, a pitch of the feed screw and a conduction time, the position sensor may be dispensed with.

The twenty-third embodiment is the sequence of establishing the connection while allowing the solution to flow out and hence, can minimize the potential risk of air invasion into the flow path.

Embodiment 24

This embodiment illustrates a separation column connecting device configured to include a plurality of separation columns and a plurality of drivers.

Figure 25:
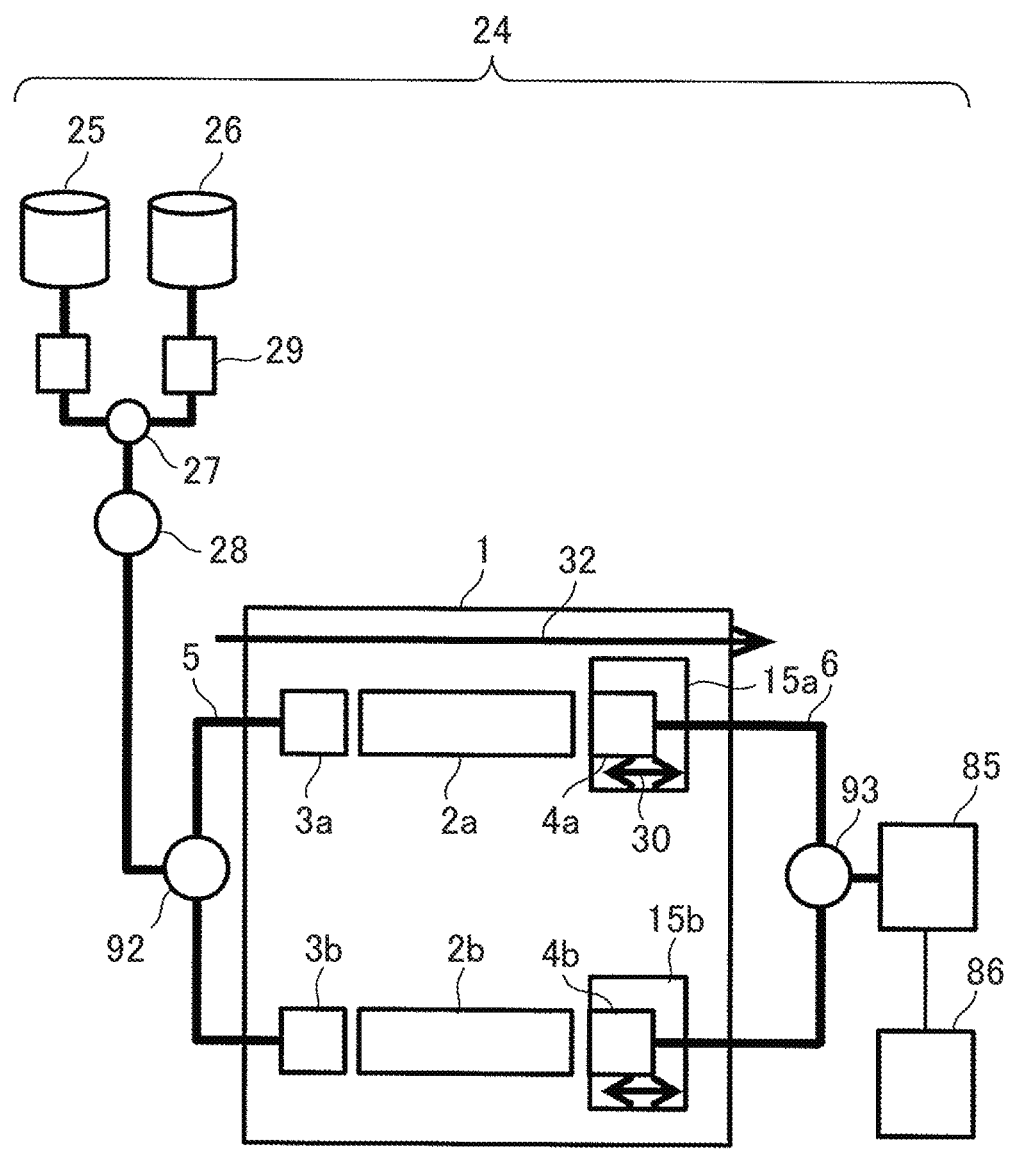
FIG. 25 is a schematic diagram showing an example of a separation column connecting device and an analysis system using the same.

FIG. 25 is a schematic diagram showing an exemplary configuration of a separation column connecting device 1 according to a twenty-fourth embodiment and an analysis system 24 using the same. Since the separation column connecting device and the analysis system are basically configured almost the same way as those shown in FIGS. 2A to 2D and FIG. 3, the description is made on differences. The device of the embodiment includes the plurality of separation columns and the plurality of drivers.

In the case of the embodiment shown in FIG. 25, the connecting device includes: a pair of separation columns 2a, 2b; associated two pairs of first fittings 3a, 3b and second fittings 4a, 4b; and a pair of drivers 15a, 15b. The driver 15a and the driver 15b can operate independently. When analysis is performed, the solution is fed to a desired separation column by switching valves 92, 93. While the figure illustrates the analysis system including two separation columns, the number of separation columns is not limited to two but may be three or more.

The configuration of the twenty-fourth embodiment includes the plurality of separation columns to be used in turn as switched by the valves. While one separation column is used for analysis, the other separation column can be subjected to washing or equilibrating. That is, the configuration of the embodiment achieves throughput improvement. Further, the configuration also enables to downsize a high-throughput apparatus equipped with a plurality of separation columns.

Embodiment 25

This embodiment illustrates a separation column connecting device configured to include a plurality of separation columns.

Figure 26:
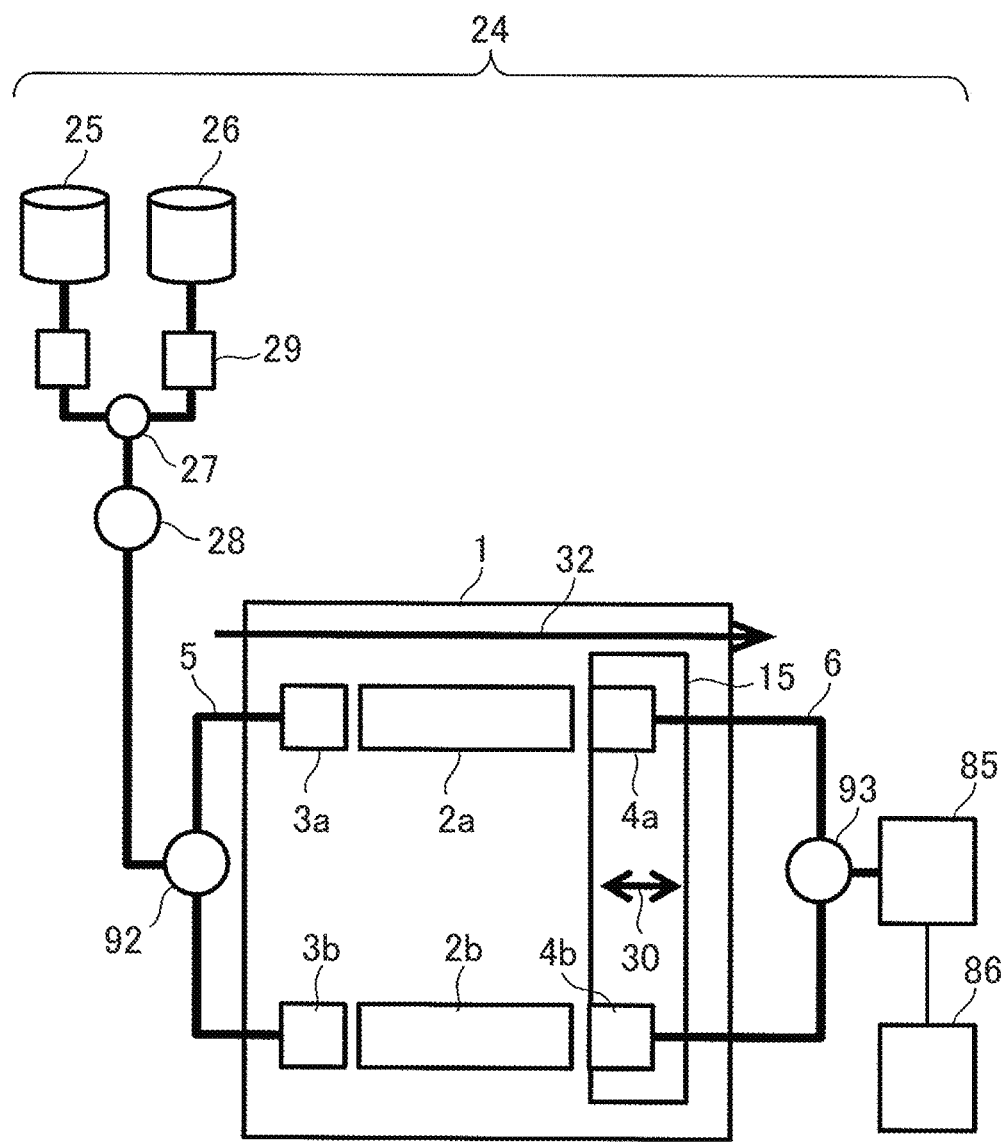
FIG. 26 is a schematic diagram showing an example of a separation column connecting device and an analysis system using the same.

FIG. 26 is a schematic diagram showing an exemplary configuration of a separation column connecting device 1 according to a twenty-fifth embodiment and an analysis system 24 using the same. Since the separation column connecting device and the analysis system are basically configured almost the same way as those shown in FIGS. 2A to 2D and FIG. 3, the description is made on differences. The device of the embodiment includes a plurality of separation columns but one driver.

The device of the embodiment shown in FIG. 26 includes two separation columns 2A, 2b; and associated two pairs of first fittings 3a, 3b and second fittings 4a, 4b. It is noted that the second fittings 4a, 4b are driven by one common driver 15. When analysis is performed, the solution is fed to a desired separation column by switching the valves 92, 93.

The configuration of the twenty-fifth embodiment permits a single driver to accomplish the connection of the plurality of separation columns with the plurality of fittings and the disconnection of the plurality of fittings from the plurality of separation columns. This leads to the downsizing of the device.

Embodiment 26

This embodiment illustrates a separation column connecting device including a cartridge capable of accommodating a plurality of separation columns.

Figure 27:
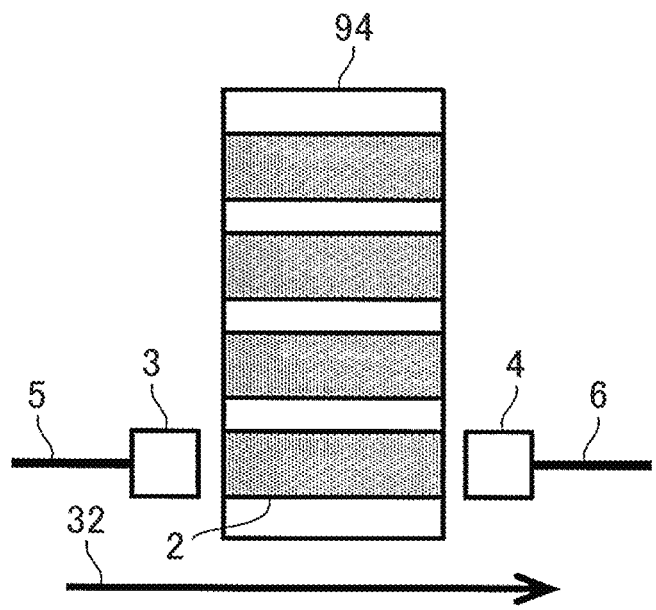
FIG. 27 is a schematic diagram showing an exemplary configuration of a separation column connecting device.

FIG. 27 is a schematic diagram showing an exemplary configuration of a separation column connecting device according to a twenty-sixth embodiment. The figure shows examples of the separation column 2, the first fitting 3 and the second fitting 4. Since the separation column connecting device is basically configured almost the same way as that shown in FIGS. 2A to 2D, the description is made on differences.

The device of the embodiment includes a cartridge 94 capable of accommodating the plurality of separation columns 2. Some of the separation columns 2 are so small as to have a length on the order of 10 mm. Such a small separation column is sometimes difficult to handle. However, the configuration of the twenty-sixth embodiment provides enhanced handlability by accommodating the separation columns in the cartridge.

Embodiment 27

A twenty-seventh embodiment illustrates a separation column connecting device configured to include a driver adapted to drive the separation column in a direction perpendicular to the driving direction for connection of the separation column and the fitting.

Figure 28:
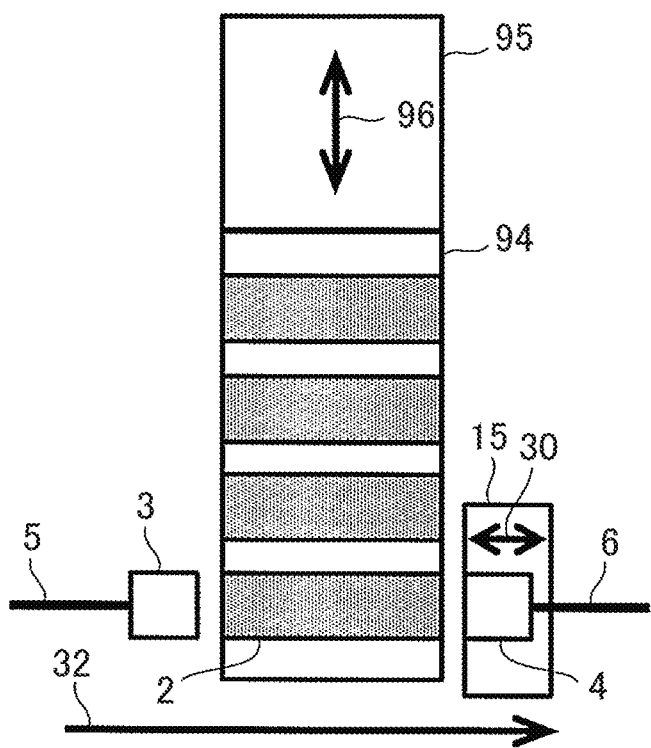
FIG. 28 is a schematic diagram showing an exemplary configuration of a separation column connecting device.

FIG. 28 is a schematic diagram showing an exemplary configuration of a separation column connecting device according to the twenty-seventh embodiment. The figure shows examples of the separation column 2, the first fitting 3 and the second fitting 4. Since the separation column connecting device is basically configured almost the same way as that shown in FIGS. 2A to 2D, the description is made on differences.

The device of the embodiment includes a second driver 95 for moving the cartridge 94 capable of accommodating the plurality of separation columns 2 in a direction perpendicular to the moving direction of the driver 15 as indicated by the arrow 30. The change to a separation column 2 to be used can be accomplished by the second driver 95 moving the cartridge 94 as indicated by an arrow 96.

The configuration of the twenty-seventh embodiment provides easy change of the separation column.

While the device configurations of the foregoing embodiments have been described, the effect of the invention is also obtainable in the form of device combining feature elements of the different device configurations. The driver can employ various systems which include: linear motion mechanisms such as air cylinder; mechanisms for converting rotation to linear motion, such as cam and rack gear; and the like. The elastic body for first providing the connection of the first fitting to the separation column may employ a member such as rubber.

It is noted that the invention is not limited to the forgoing embodiments but can include various modifications. For instance, the foregoing embodiments have been specifically described for greater clarity of the invention. The invention is not necessarily limited to what includes all the described components. Some component of one embodiment can be replaced by some component of another embodiment. Further, some component of one embodiment can be added to the arrangement of another embodiment. Apart of the configuration of each embodiment permits addition of some component of another embodiment, the omission thereof or replacement thereof.

LIST OF REFERENCE SIGNS

2: separation column
3: first fitting

4: second fitting
5: pipe
6: pipe
7: seal portion
8: seal portion
9: seal portion
10: seal portion
11: column holder
12: first fitting holder
13: second fitting holder
14: guide
15: driver
16: rail
17: compression spring
20: first stopper
21: second stopper
41: guide shaft
42: motor
50: lever
51: arm
56: tension spring
57: cylinder
58: piston
80: first liquid sensor
81: first position sensor
83: second liquid sensor
84: second position sensor
85: detector
86: data processor
94: cartridge

The invention claimed is:

1. A separation column connecting device comprising:
a column holder for retaining a separation column;
a first fitting holder carrying a first fitting which includes a seal portion to be connected to an upstream seal portion of the separation column and is connected with an upstream pipe;
a second fitting holder carrying a second fitting which includes a seal portion to be connected to a downstream seal portion of the separation column and is connected with a downstream pipe;
a body member to which either one of the first fitting holder and the second fitting holder is fixed;
a driver for moving, relative to the body member, the first fitting holder or the second fitting holder that is not fixed to the body member and moving the column holder relative to the body member;
a guide for guiding the column holder in a direction of movement driven by the driver; and
an elastic body disposed between the column holder and the second fitting holder.

2. The separation column connecting device according to claim 1,
wherein
$L \leq L1+L2$,
$L3=L2$
provided that in an open position where the first fitting and the second fitting are separate from the separation column, L1 denotes a distance between the upstream seal portion of the separation column and the seal portion of the first fitting, L2 denotes a distance between the downstream seal portion of the separation column and the seal portion of the second fitting, L3 denotes a displacement of the elastic body between a connection position where the first fitting and the second fitting are connected to the separation column and the open position, and L denotes a range of movement of the driver.

3. The separation column connecting device according to claim 2,
wherein the second fitting holder includes a first stopper for limiting the movement of the column holder in order that a distance between the separation column and the second fitting does not exceed L2.

4. The separation column connecting device according to claim 3,
wherein the first stopper and the column holder each include a contact portion for inhibiting each other from moving freely in a driving direction of the driver, and
a distance between the contact portion of the first stopper and the contact portion of the column holder is L2 when the separation column is in the connection position.

5. The separation column connecting device according to claim 2,
wherein the first fitting holder includes a second stopper for limiting the movement of the column holder in order that a distance between the first fitting and the separation column does not exceed L1.

6. The separation column connecting device according to claim 5,
wherein the second stopper and the guide or the column holder each include a contact structure for inhibiting each other from moving freely in a driving direction of the driver, and
a distance between a contact portion of the second stopper and a contact portion of the guide or the column holder is L1 when the separation column is in the connection position.

7. The separation column connecting device according to claim 1,
wherein the first fitting holder is fixed to the body member, and the driver moves the second fitting holder relative to the body member.

8. The separation column connecting device according to claim 1,
wherein the second fitting holder is fixed to the body member, and the driver moves the first fitting holder relative to the body member.

9. The separation column connecting device according to claim 1,
wherein the driver includes a feed screw.

10. The separation column connecting device according to claim 1, further comprising:
a temperature control part for controlling the temperature of at least one of the separation column, the first fitting, the second fitting, the upstream pipe connected to the first fitting and the downstream pipe connected to the second fitting.

11. The separation column connecting device according to claim 1, further comprising:
a first liquid sensor for detecting a solution flowing out from an outlet of the first fitting; and
a second liquid sensor for detecting a solution flowing out from an outlet of the separation column.

12. An analysis system comprising:
a separation column connecting device which includes:
a column holder for retaining a separation column;
a first fitting holder carrying a first fitting which includes a seal portion to be connected to an upstream seal portion of the separation column and is connected with an upstream pipe;

a second fitting holder carrying a second fitting which includes a seal portion to be connected to a downstream seal portion of the separation column and is connected with a downstream pipe;

a body member to which either one of the first fitting holder and the second fitting holder is fixed;

a driver for moving, relative to the body member, the first fitting holder or the second fitting holder that is not fixed to the body member and moving the column holder relative to the body member;

a guide for guiding the column holder in a direction of movement driven by the driver; and an elastic body disposed between the column holder and the second fitting holder;

a pump for feeding a sample to the separation column via the upstream pipe;

a sample injection part for injecting the sample into the upstream pipe;

a detector for detecting an elution component from the separation column; and a data processor for analysis of detection result obtained by the detector.

13. A separation column connection method comprising:

placing a separation column between a first fitting and a second fitting, the first fitting including a seal portion to be connected to an upstream seal portion of the separation column and is connected with an upstream pipe, and the second fitting including a seal portion to be connected to a downstream seal portion of the separation column and is connected with a downstream pipe;

first connecting the first fitting to the separation column by bringing the first fitting and the second fitting close to each other by applying a repulsive force or a resistive force between the separation column and the second fitting; and connecting the second fitting to the separation column by further bringing the first fitting and the second fitting closer to each other.

14. The separation column connection method according to claim 13, wherein the first fitting is connected to the separation column after a solution through the upstream pipe flows out from an outlet of the first fitting, and the second fitting is connected to the separation column after the solution flows out from an outlet of the separation column.

15. The separation column connection method according to claim 14, wherein the first fitting is connected to the separation column after a first liquid sensor detects the solution flowing out from the outlet of the first fitting, and the second fitting is connected to the separation column after a second liquid sensor detects the solution flowing out from the outlet of the separation column.

* * * * *